US012603448B2

(12) United States Patent
Strahl et al.

(10) Patent No.: US 12,603,448 B2
(45) Date of Patent: Apr. 14, 2026

(54) CARD CONNECTOR

(71) Applicant: Amphenol Corporation, Wallingford, CT (US)

(72) Inventors: Erik Strahl, Unadilla, NY (US); Ritch Allen Selfridge, DuBois, PA (US); Kyle Matthew Tompkins, Endicott, NY (US)

(73) Assignee: AMPHENOL CORPORATION, Wallingford, CT (US)

( * ) Notice: Subject to any disclaimer, the term of this patent is extended or adjusted under 35 U.S.C. 154(b) by 663 days.

(21) Appl. No.: 18/075,946

(22) Filed: Dec. 6, 2022

(65) Prior Publication Data

US 2024/0186734 A1 Jun. 6, 2024

(51) Int. Cl.
*H01R 12/73* (2011.01)
*H01R 13/631* (2006.01)

(52) U.S. Cl.
CPC ......... *H01R 12/737* (2013.01); *H01R 13/631* (2013.01)

(58) Field of Classification Search
CPC .... H01R 12/737; H01R 13/631; H01R 12/91; H01R 13/6315
See application file for complete search history.

(56) References Cited

U.S. PATENT DOCUMENTS

| | | | | |
|---|---|---|---|---|
| 6,746,281 B1 * | 6/2004 | Zhang | H01R 12/725 | 439/637 |
| 6,787,709 B2 | 9/2004 | Vinther | | |
| 6,909,056 B2 | 6/2005 | Vinther | | |
| 6,945,823 B2 * | 9/2005 | Lee | H01R 12/585 | 439/660 |
| 7,126,062 B1 | 10/2006 | Vinther et al. | | |
| 7,556,503 B2 | 7/2009 | Vinther | | |
| 8,926,342 B2 * | 1/2015 | Vinther | H01R 13/6473 | 439/79 |
| 2003/0129878 A1 * | 7/2003 | Hasircoglu | H01R 13/6315 | 439/607.07 |
| 2005/0032433 A1 * | 2/2005 | Lee | H01R 12/585 | 439/660 |
| 2020/0381872 A1 * | 12/2020 | Laurx | H01R 13/6587 | |
| 2024/0186734 A1 * | 6/2024 | Strahl | H01R 13/631 | |

* cited by examiner

*Primary Examiner* — Abdullah A Riyami
*Assistant Examiner* — Nader J Alhawamdeh
(74) *Attorney, Agent, or Firm* — CANTOR COLBURN LLP

(57) ABSTRACT

A connector assembly includes an electrical connector including a plurality of electrical contacts and a backplane connector electrically connectable to the electrical connector. The backplane connector is positioned along an axis with the electrical connector and is movable within a plane arranged at an angle relative to the axis. An interposer member is mechanically connected to and electrically connectable to the plurality of electrical contacts and is positioned along the axis. The interposer member is positioned between the electrical connector and the backplane connector.

27 Claims, 18 Drawing Sheets

CARD CONNECTOR

BACKGROUND

Electronic systems may be assembled from multiple printed circuit boards (PCBs). In such systems, one or more PCBs typically serves as a backplane and additional PCBs are connected to and extend from the backplane PCB (e.g., perpendicularly) via electrical connector assemblies.

BRIEF DESCRIPTION

Embodiments of the disclosure relate generally to electronic assemblies, and more particularly, to electrical connector assemblies for interconnecting printed circuit boards, such as a backplane PCB and other PCBs. When a backplane PCB and other PCBs are coupled by one or more electrical connector assemblies, a slight misalignment between the connector assemblies and the PCBs may result due to tolerance stackups. This misalignment may be addressed via the use of electrical contacts that are capable of deforming, though such deforming could add stress to the system and impact reliability of the connection.

According to an embodiment, a connector assembly includes an electrical connector including a plurality of electrical contacts and a backplane connector electrically connectable to the electrical connector. The backplane connector is positioned along an axis with the electrical connector and is movable within a plane arranged at an angle relative to the axis. An interposer member is mechanically connected to and electrically connectable to the plurality of electrical contacts and is positioned along the axis. The interposer member is positioned between the electrical connector and the backplane connector.

In addition to one or more of the features described above, or as an alternative, in further embodiments the backplane connector is electrically connectable to the interposer member.

In addition to one or more of the features described above, or as an alternative, in further embodiments the backplane connector is movable relative to the interposer member within the plane arranged at the angle relative to the axis between a first aligned configuration and a second misaligned configuration.

In addition to one or more of the features described above, or as an alternative, in further embodiments the backplane connector is electrically connectable to the plurality of electrical contacts in both the first aligned configuration and the second misaligned configuration.

In addition to one or more of the features described above, or as an alternative, in further embodiments the interposer member further includes a plurality of first attachment regions electrically and mechanically connectable to the plurality of electrical contacts and a plurality of second attachment regions electrically connectable to the backplane connector.

In addition to one or more of the features described above, or as an alternative, in further embodiments the plurality of second attachment regions are larger than the plurality of first attachment regions.

In addition to one or more of the features described above, or as an alternative, in further embodiments the plurality of second attachment regions are sized to couple to the backplane connector in both the first aligned configuration and the second misaligned configuration.

In addition to one or more of the features described above, or as an alternative, in further embodiments including at least one guide pin extending beyond a surface of the interposer member. The backplane connector further includes at least one opening within which the at least one guide pin is receivable.

In addition to one or more of the features described above, or as an alternative, in further embodiments a clearance is formed between an inner diameter of the at least one opening and the at least one guide pin.

In addition to one or more of the features described above, or as an alternative, in further embodiments the clearance extends in a plurality of directions.

In addition to one or more of the features described above, or as an alternative, in further embodiments the at least one guide pin extends from the electrical connector and the interposer member further includes at least one through opening. The at least one guide pin is receivable within the at least one through opening.

In addition to one or more of the features described above, or as an alternative, in further embodiments a diameter of the at least one opening is greater than a diameter of the at least one through opening.

In addition to one or more of the features described above, or as an alternative, in further embodiments includes at least one fastener extendable through each of the electrical connector, the interposer member, and the backplane connector.

In addition to one or more of the features described above, or as an alternative, in further embodiments the electrical connector is connectable to a first substrate and the backplane connector is connectable to a second substrate.

In addition to one or more of the features described above, or as an alternative, in further embodiments the first substrate is arranged perpendicular to the second substrate.

According to an embodiment, a connector assembly includes a first component including a plurality of electrical contacts and at least one guide pin. A third component includes a plurality of backplane contacts electrically connectable to the plurality of electrical contacts and at least one opening for receiving the at least one guide pin. The at least one opening is larger than the at least one guide pin such that the third component is movable relative to the first component.

In addition to one or more of the features described above, or as an alternative, in further embodiments a clearance is formed between an inner diameter of the at least one opening and the at least one guide pin.

In addition to one or more of the features described above, or as an alternative, in further embodiments the clearance extends in a plurality of directions.

In addition to one or more of the features described above, or as an alternative, in further embodiments the third component is movable relative to the first component between a first aligned configuration and a second misaligned configuration.

In addition to one or more of the features described above, or as an alternative, in further embodiments including a second component stackable relative to the first component along an axis. The second component is positionable between the first component and the third component.

In addition to one or more of the features described above, or as an alternative, in further embodiments the second component further includes a plurality of first attachment regions electrically and mechanically connectable to the first component and a plurality of second attachment regions electrically connectable to the third component.

In addition to one or more of the features described above, or as an alternative, in further embodiments the plurality of second attachment regions are larger than the plurality of first attachment regions.

In addition to one or more of the features described above, or as an alternative, in further embodiments the third component is movable relative to the second component between a first aligned configuration and a second misaligned configuration.

In addition to one or more of the features described above, or as an alternative, in further embodiments the plurality of second attachment regions are sized to couple to the third component in both the first aligned configuration and the second misaligned configuration.

In addition to one or more of the features described above, or as an alternative, in further embodiments the second component further includes at least one through opening and the at least one guide pin is receivable within the at least one through opening.

In addition to one or more of the features described above, or as an alternative, in further embodiments the first component is connectable to a first substrate and the third component is connectable to a second substrate.

In addition to one or more of the features described above, or as an alternative, in further embodiments the first substrate is arranged perpendicular to the second substrate.

According to an embodiment, an interconnection system includes at least one connector assembly having an electrical terminal assembly for receiving a first substrate and a backplane connector electrically connected to the electrical terminal assembly along an axis. The backplane connector is movable within a plane arranged at an angle relative to the axis. The at least one connector assembly is affixed and electrically connected to a second substrate.

In addition to one or more of the features described above, or as an alternative, in further embodiments the at least one connector assembly further includes a plurality of connector assemblies.

In addition to one or more of the features described above, or as an alternative, in further embodiments the backplane connector of the at least one connector assembly is electrically coupled to the second substrate.

In addition to one or more of the features described above, or as an alternative, in further embodiments the at least one connector assembly is loosely connected to the second substrate.

In addition to one or more of the features described above, or as an alternative, in further embodiments the backplane connector is movable within the plane between a first aligned configuration and a second misaligned configuration. The backplane connector is electrically connected to the electrical terminal assembly in both the first aligned configuration and the second misaligned configuration.

According to an embodiment, a connector assembly includes an interposer member having a plurality of first attachment regions and a plurality of second attachment regions. A backplane connector is electrically connectable to the plurality of second attachment regions. The backplane connector is positioned along an axis relative to the interposer member and is movable relative to the interposer member about an area of movement. The said second attachment regions are larger than said area of movement.

In addition to one or more of the features described above, or as an alternative, in further embodiments the backplane connector is movable relative to the interposer member between a first aligned configuration and a second misaligned configuration.

In addition to one or more of the features described above, or as an alternative, in further embodiments the backplane connector further includes a plurality of backplane contacts. The plurality of backplane contacts are positionable in contact with the plurality of second attachment regions in both the first aligned configuration and the second misaligned configuration.

In addition to one or more of the features described above, or as an alternative, in further embodiments including at least one guide pin protruding beyond the interposer member. The backplane connector further includes at least one opening within which the at least one guide pin is receivable.

In addition to one or more of the features described above, or as an alternative, in further embodiments a clearance is formed between an inner diameter of the at least one opening the said at least one guide pin.

In addition to one or more of the features described above, or as an alternative, in further embodiments the clearance extends in a plurality of directions.

In addition to one or more of the features described above, or as an alternative, in further embodiments the clearance defines the area of movement of the backplane connector.

In addition to one or more of the features described above, or as an alternative, in further embodiments the interposer member further includes at least one through opening. The at least one guide pin is receivable within the at least one through opening.

In addition to one or more of the features described above, or as an alternative, in further embodiments a diameter of the at least one opening is greater than a diameter of said at least one through opening.

BRIEF DESCRIPTION OF THE DRAWINGS

The following descriptions of the figures should not be considered limiting in any way. In the figures, like elements may be numbered with like reference numbers.

DETAILED DESCRIPTION

Figure 1:
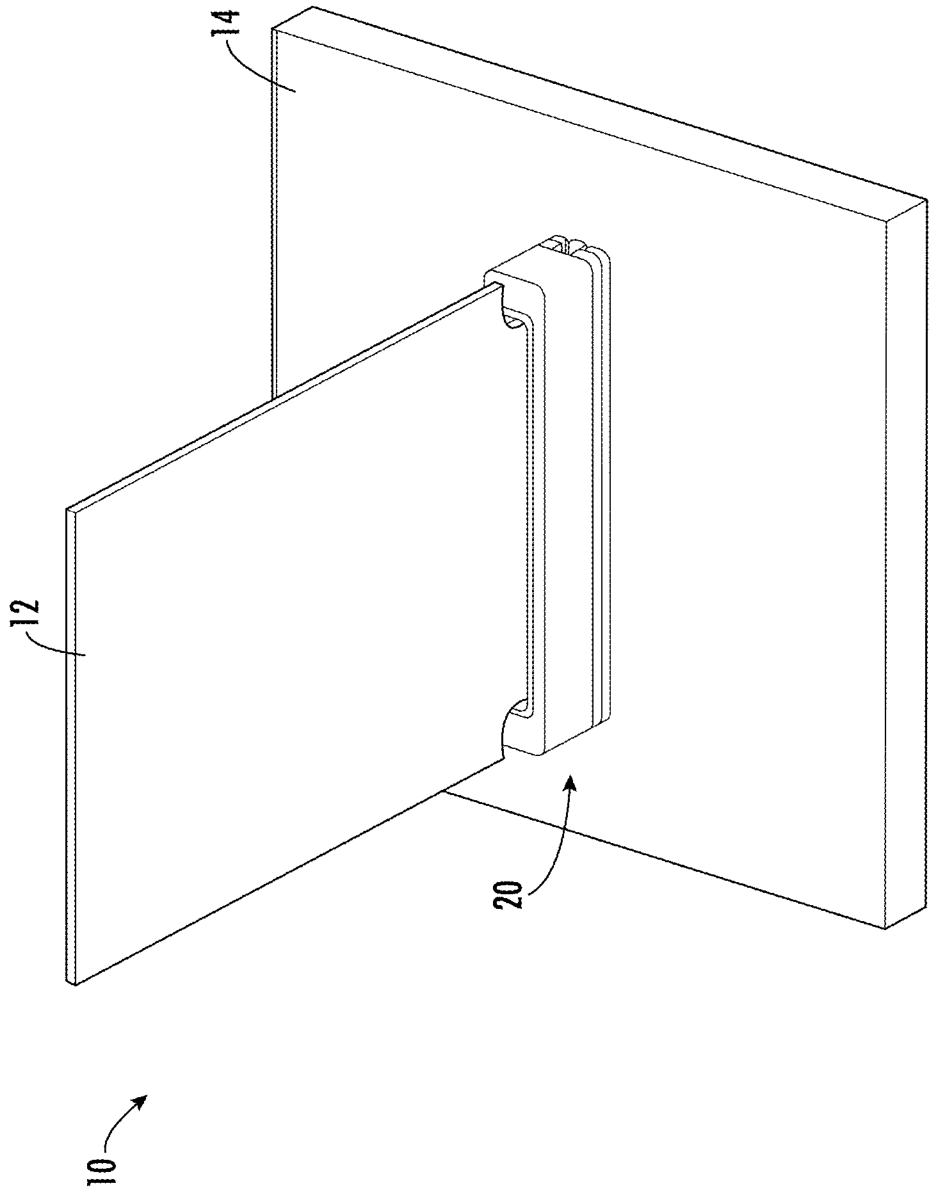
FIG. 1 is a perspective view of an exemplary interconnection system.

A detailed description of one or more embodiments of the disclosed apparatus and method are presented herein by way of example and not limitation with reference to the Figures.

With reference to the FIGS., an exemplary connector assembly 20 suitable for use in an interconnection system 10 is illustrated. In the illustrated, non-limiting embodiment, the interconnection system 10 includes a first substrate 12, such as a first printed circuit board (PCB), a second substrate 14, such as a second printed circuit board, and a connector assembly 20 configured to mount the first substrate 12 to the second substrate 14. As shown, the first substrate 12, which may be a card edge PCB, is oriented substantially perpendicular to the second substrate 14, which may be a backplane or backplane PCB, when connected thereto via the connector assembly 20. However, it should be understood that the connector assembly 20 need not be limited to use in systems where the first and second substrates 12, 14 are arranged at a right angle to one another and may instead be used in any suitable application.

With reference now to FIGS. 2-5, a connector assembly 20 according to an embodiment is illustrated in more detail. As shown, the connector assembly 20 may include a plurality of components, such as a first component, a second component, and a third component for example. As will be described in more detail below, the first component, second component, and third component are stackable or positionable adjacent to one another, along an axis X. The axis X may be oriented parallel to or coaxial with a longitudinal axis of the first substrate 12. In an embodiment, the first component 22 of the connector assembly 20 is an electrical connector. The electrical connector 22 may include an electrical terminal assembly 24, an internal member 26, and a protective shell or housing 28. The housing 28 may be formed from a conductive material, such as stainless steel for example. However, a housing 28 formed from another suitable material, such as any conductive or non-conductive material for example, is also contemplated herein.

Figure 4:
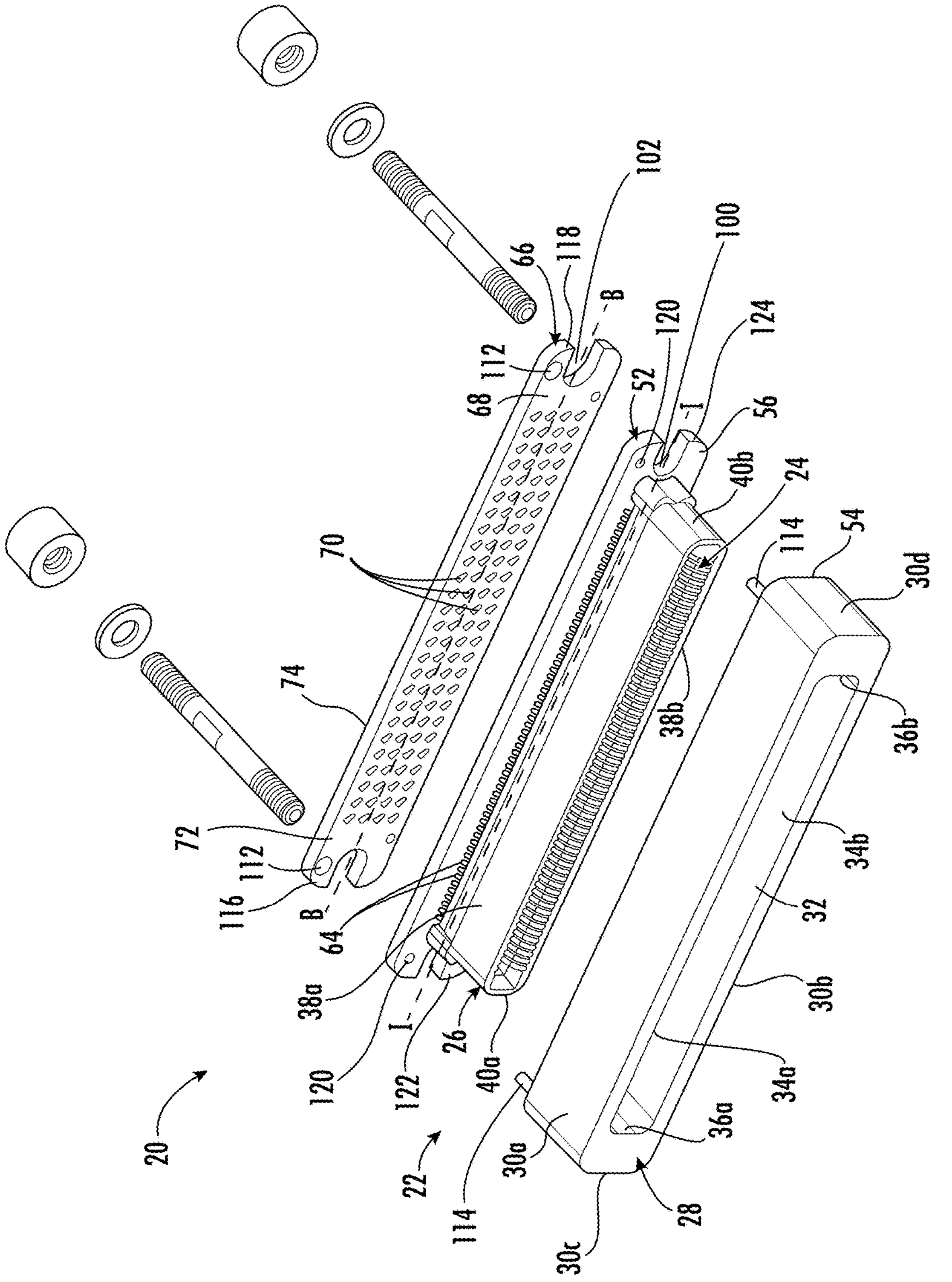
FIG. 4 is another perspective exploded view of a connector assembly according to an embodiment.

In the illustrated, non-limiting embodiment, the housing includes a plurality of parallel sides 30*a*-30*d* (see FIG. 4), such as arranged in pairs of opposing walls for example. However, embodiments where the housing 28 has another configuration, such as where the housing is circular, triangular, or polygonal for example, are also within the scope of this disclosure. A slot 32 extends through a central portion of the housing 28. As best shown in FIG. 4, the slot 32 may have a first slot sidewall 34*a*, a second, opposite slot sidewall 34*b*, and first and second slot end walls 36*a*, 36*b* connecting adjacent ends of the first and second slot sidewalls 34*a*, 34*b*, respectively. The first and second slot sidewalls 34*a*, 34*b* and the first and second slot end walls 36*a*, 36*b* may, but need not be oriented substantially parallel to the plurality of sides 30*a*-30*d* of the housing 28.

The internal member 26 is permanently or removably receivable within the slot 32 of the housing 28. Accordingly, the overall size and shape of the outer diameter of the internal member 26 may be complementary to the slot 32. For example, the size and shape of the internal member 26 may be equal to or slightly smaller than the size and shape of the slot 32 such that the internal member 26 is positionable therein. When the internal member 26 is arranged within the slot 32, an end 27 (see, e.g., FIG. 3) of the internal member 26 may be flush with the adjacent front end 29 of the housing 28. However, embodiments where the end 27 of the internal member 26 is offset from the front end 29 of the housing 28 are also contemplated herein (see, e.g., FIG. 5). In an embodiment, a height of the internal member 26, measured along the axis X and oriented parallel to at least one of the first and second slot sidewalls 34*a*, 34*b*, is less than or equal to the height of the housing 28.

In the illustrated, non-limiting embodiment, the internal member 26 includes a body having a pair of sidewalls 38*a*, 38*b* and a pair of connecting portions 40*a*, 40*b* that extend between and couple the pair of sidewalls 38*a*, 38*b*. The sidewalls 38*a*, 38*b* of the internal member 26 may be oriented parallel to the first and second slot sidewalls 34*a*, 34*b*, and the connecting portions 40*a*, 40*b* of the internal member 26 may be oriented parallel to the first and second slot end walls 36*a*, 36*b* to facilitate installation of the internal member 26 into the slot 32. However, embodiments where the body of the internal member 26 has another configuration receivable within the slot 32 of the housing 28 are also within the scope of this disclosure. The body of the internal member 26 may be formed as a single piece, or alternatively, may be formed from multiple combined portions.

A clearance or hollow interior 42 (see FIG. 5) may be defined between the sidewalls 38*a*, 38*b* and the connecting portions 40*a*, 40*b*. The electrical terminal assembly 24 is positionable within the hollow interior 42. In an embodiment, the electrical terminal assembly 24 is press-fit into the hollow interior 42. An example of an electrical terminal assembly 24 is illustrated in more detail in FIG. 6. In the illustrated, non-limiting embodiment, the electrical terminal assembly 24 includes a first terminal subassembly 44*a* and a second terminal subassembly 44*b*. In some embodiments, first and second terminal subassemblies 44*a*, 44*b* are substantially identical. However, in other embodiments, the first and second terminal subassemblies 44*a*, 44*b* may vary. For example, the first and second terminal subassemblies 44*a*, 44*b* may be shaped so as to nest one inside the other.

In the illustrated, non-limiting embodiment, each of the first and second terminal subassemblies 44*a*, 44*b* includes a plurality of electrical contacts, and the first substrate 12 is receivable within a clearance 46 formed between the arrays of electrical contacts. The electrical contacts may be formed with a spring-like resiliency. When a first substrate 12 is connected to the electrical terminal assembly, an end of the first substrate 12 is inserted into the clearance 46 defined between the arrays of electrical contacts. The thickness of the first substrate 12 may be greater than the thickness of the clearance 46. As a result, the ends of the electrical contacts of the first and second terminal subassemblies 44*a*, 44*b* are pushed apart, for example towards the sidewalls 38*a*, 38*b* of the internal member 26. In an embodiment, the contacts of the first and second terminal subassemblies 44*a*, 44*b* are compressed against the adjacent surfaces of the sidewalls 38*a*, 38*b* of the internal member 26. However, because of the resilient nature of the electrical contacts, the electrical contacts remain engaged with, and therefore electrically connected to the surface of the first substrate 12. Further, when the first substrate 12 is removed from the clearance 46, the electrical contacts will generally spring back to their original position.

Figure 6:
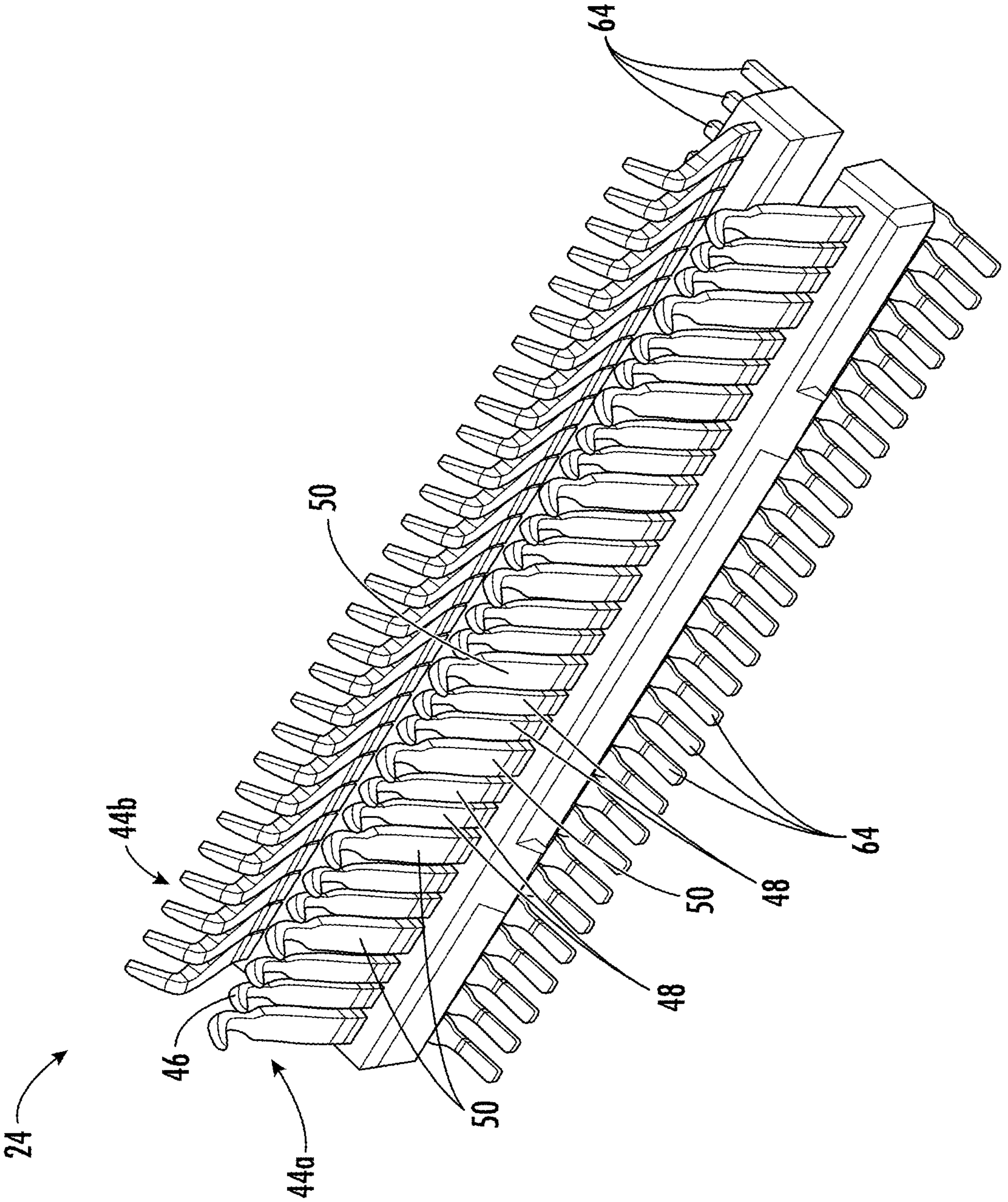
FIG. 6 is a perspective view of an electrical terminal assembly of the connector assembly according to an embodiment.

In the non-limiting embodiment of FIG. 6, the at least one array of electrical contacts includes both signal contacts 48 and ground contacts 50. However, in other embodiments, the array of electrical contacts may include only a plurality of signal contacts and no ground contacts. Although two signal contacts 48 are illustrated as being positioned between a pair of ground contacts 50, it should be understood that any suitable configuration of ground contacts 50 and signal contacts 48 is contemplated herein. The plurality of electrical contacts within an array may be substantially identical, or may be different. For example, in embodiments including both signal and ground contacts, the width of the ground contacts 50 may be greater than a width of the signal contacts 48 as shown. It should be understood that the electrical terminal assembly 24 illustrated and described herein is intended as an example only and that an electrical terminal assembly 24 having any suitable configuration is contemplated herein.

The electrical contacts of the electrical terminal assembly 24 include contact tails 64 that extend from an end thereof. As will be described in more detail below, these contact tails 64 are configured to mechanically and electrically couple to another component of the connector assembly 20, such as the second component for example.

Figure 3:
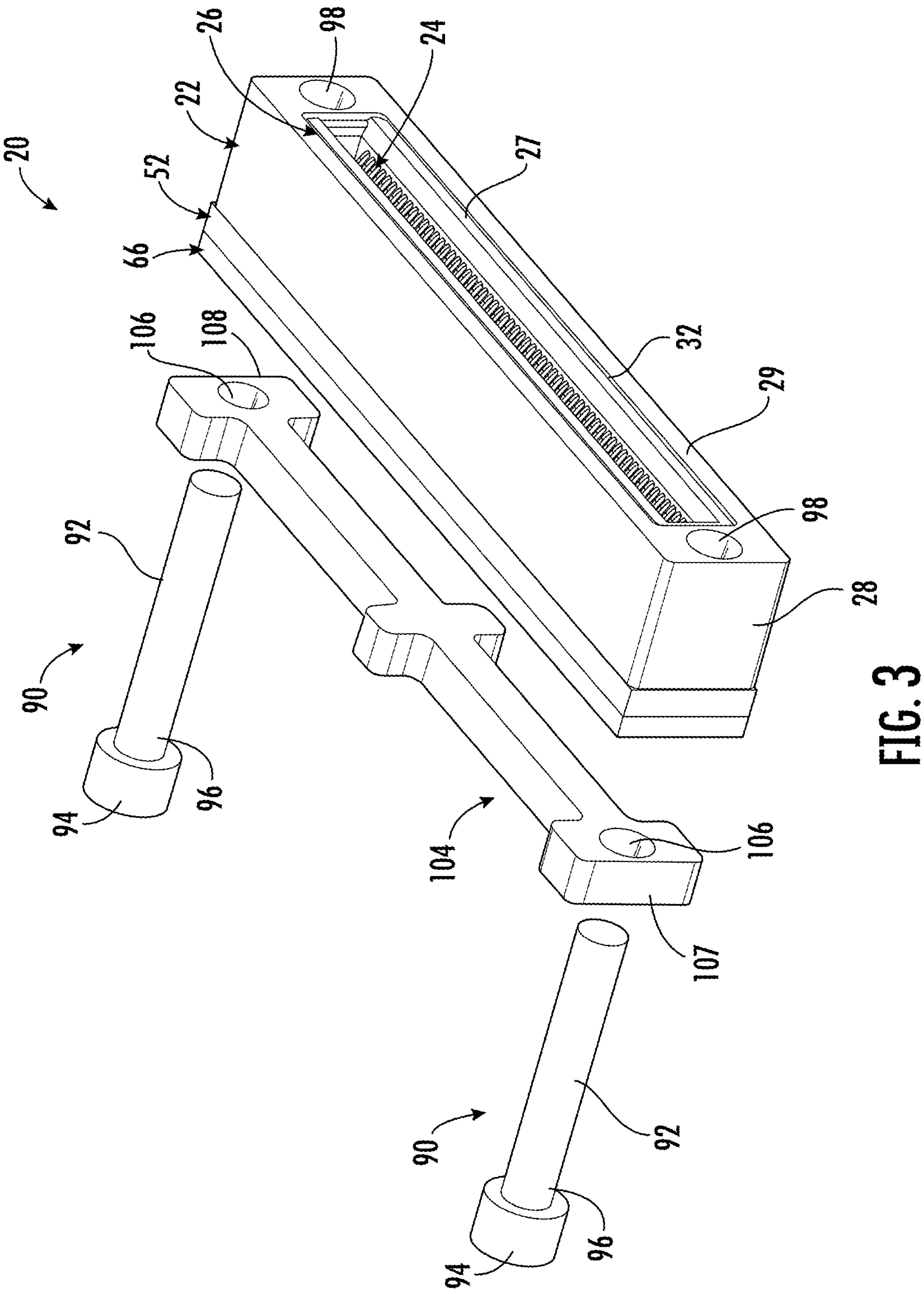
FIG. 3 is a perspective partially exploded view of a connector assembly according to an embodiment.

The connector assembly 20 includes a second component 52, also referred to herein as an interposer member. The second component 52 may be positioned directly adjacent to the housing 28, such as end 54 of the housing for example. Accordingly, the second component 52 is stackable relative to the first component 22 along an axis X. Although the second component 52 is illustrated as being generally rectangular in shape (in a plan view), it should be understood that embodiments where the second component 52 has another shape are also within the scope of the disclosure. In an embodiment, as shown in FIG. 3, the size and/or shape of the second component 52 (in a plan view) is substantially identical to the size and/or shape of the adjacent end 54 of the housing 28 of the first component 22 in the same plan view. However, in other embodiments, the size and/or shape of the second component 52 (in plan view) may differ from that of the adjacent end 54 of the housing 28.

Figure 5:
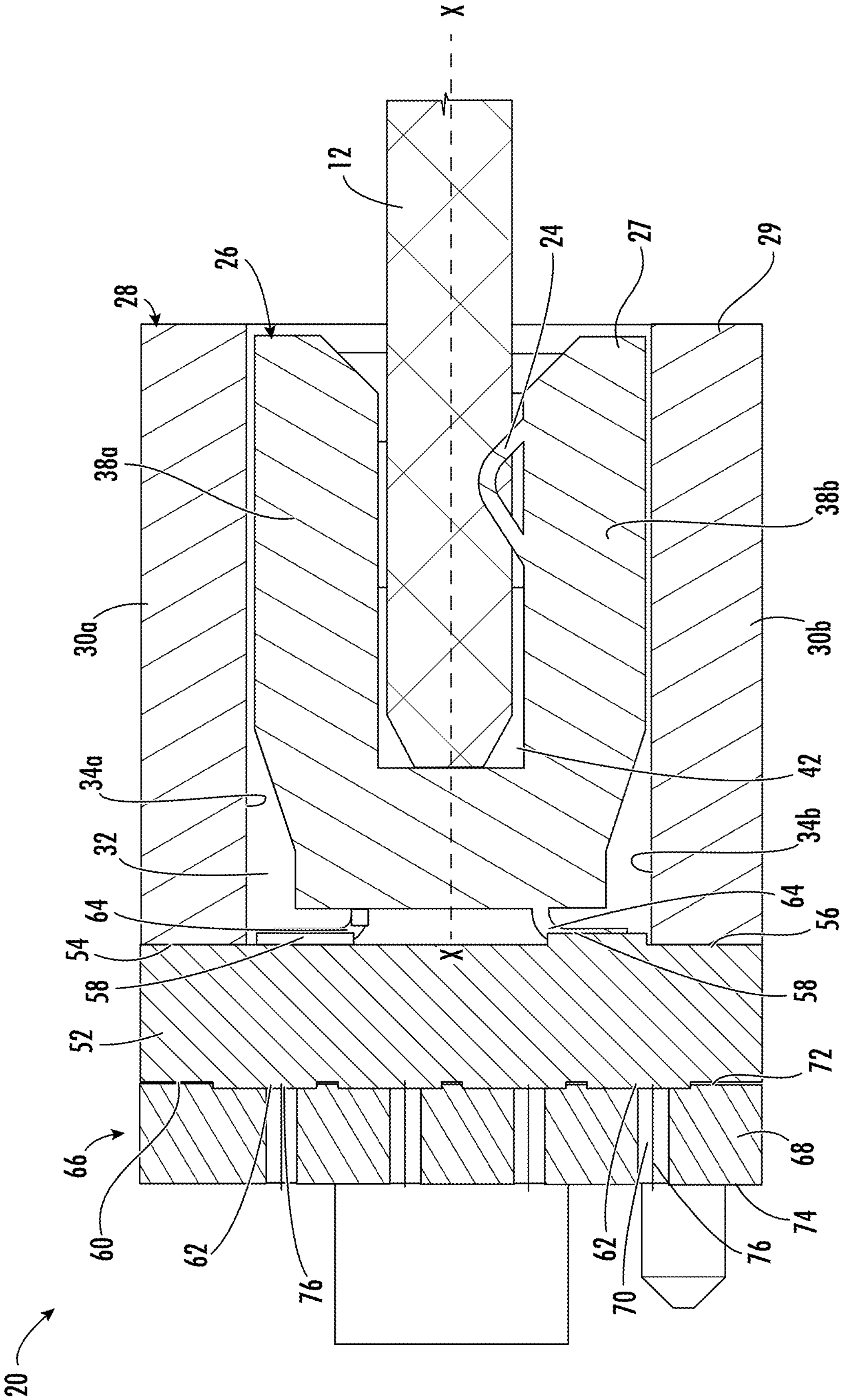
FIG. 5 is a cross-sectional view of a connector assembly connected to a first substrate according to an embodiment.

In an embodiment, the second component 52 includes a substrate, such as a glass-filled plastic, a resin having copper traces arranged therein, or another suitable circuit board configuration for example. As best shown in FIG. 5, arranged at a first surface 56 of the second component 52, facing towards the first component 22, is at least one first attachment region 58. Alternatively, or in addition, arranged at a second, opposite surface 60 of the second component 52 is at least one, and in some embodiments, a plurality of second attachment regions 62. One or more conductive members or conductive traces (not shown) extend through the second component 52 to electrically couple the first attachment region(s) 58 to the second attachment region(s) 62.

In an embodiment, each of the first attachment regions 58 and the second attachment regions 62 includes one or more electrically conductive contact pads. A configuration, such as a size and shape of each of the contact pads associated with the at least one first attachment region 58 (also referred to herein as first contact pads) may be substantially identical or may vary. Similarly, a configuration, such as the size and shape of each of the plurality of contact pads associated with the at least one second attachment region 62 (also referred to herein as second contact pads) may be substantially identical or may vary. In addition, the first contact pads and the second contact pads may have a similar configuration, or alternatively, may have varying configurations. In an embodiment, the second attachment regions 62 or contact pads thereof are larger in size than the first attachment regions or contact pads thereof, as will be described in more detail below.

The contact tails 64 extending from the end of the electrical contacts of the electrical terminal assembly 24 may be configured to contact the first attachment regions 58 of the second component 52 such that the electrical terminal assembly 24 is electrically connectable to the second component 52. In such embodiments, the contact tails 64 may be removably connected or permanently connected to the one or more first attachment regions 58. For example, the contact tails 64 may be press-fit into the plurality of first attachment regions 58, or alternatively, may be soldered to the plurality of first attachment regions 58. Accordingly, the electrical terminal assembly 24 is electrically connectable to the conductive traces and to the second attachment regions 62 of the second component 52 via the interface between the plurality of contact tails 64 and the first attachment regions 58.

The third component 66 of the connector assembly 20 is also referred to herein as backplane connector or a board interface plate. The third component 66 is positionable directly adjacent to the second component 52, opposite the first component 22. In an embodiment, the third component 66 includes a flat plate 68, such as formed from a dielectric material for example. Although the plate 68 is illustrated as being generally rectangular in shape (in plan view), it should be understood that embodiments where the third component 66 has another configuration are also within the scope of the disclosure. In an embodiment, the shape and/or size of the third component 66 (in plan view) is substantially identical to the shape and/or size of the second surface 60 of the interposer member 52.

The plate 68 may have a plurality of contact passages 70 extending through the thickness of the plate 68, between a first surface 72 and a second, opposite surface 74 thereof. Although the passages are illustrated as being arranged in an array containing several substantially identical rows, embodiments where the contact passages 70 are arranged in a single row, or alternatively, in rows having different numbers of contact passages 70 or different orientations of contact passages 70 are also contemplated herein. The contact passages 70 may be substantially uniform over the thickness of the plate 68, or alternatively may be contoured based on the configuration of a contact positionable therein.

Figure 7:
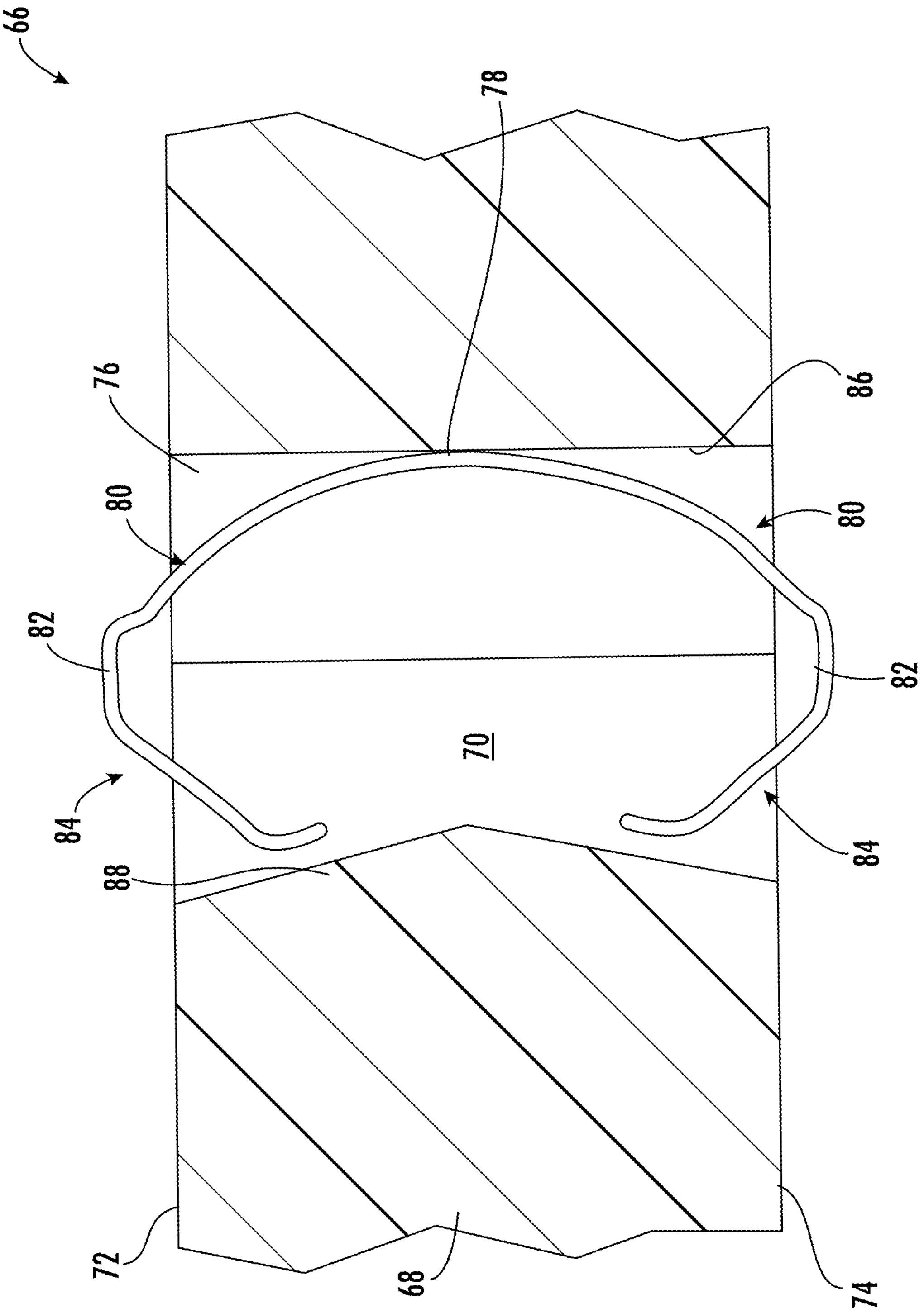
FIG. 7 is a cross-sectional view of a backplane connector of the connector assembly according to an embodiment.

A backplane contact 76 is mounted within at least one contact passage 70, and in some embodiments, a respective backplane contact 76 is mounted within each of the plurality of contact passages 70. An example of a backplane contact 76 arranged within the at least one contact passage 70 is illustrated and described in U.S. Pat. No. 6,905,343, the entire contents of which is incorporated herein by reference. The one or more backplane contacts 76 may be formed from a thin piece of metal material having a bent configuration. Alternatively, or in addition, the backplane contact 76 may have a compressible configuration. Such a compressible configuration may but need not be achieved via the formation of one or more bends in the contact. In an embodiment, the metal material is a beryllium copper plated with a conductive metal, such as gold or gold alloy. As shown in FIG. 7, in an embodiment, the backplane contacts 76 may be bent into a C-shaped configuration. The backplane contact 76 may have a central portion 78 and two arms 80 extending from opposite ends of the central portion 78. In an embodiment, the arms 80 are symmetrical about the central portion 78.

Each arm 80 of the backplane contact 76 may include a nose 82 and a retention portion 84 extending from the nose 82 to an end of the backplane contact 76. In an embodiment, the arms 80 are bent away from the central portion 78 such that the noses 82 are positioned between the central portion 78 and the retention portion 84. When the backplane contact 76 is installed within a contact passage 70, the central portion 78 may be configured to contact a first wall 86 of the contact passage 70, and the retention portions 84 may be configured to contact a second, opposite wall 88 of the contact passage 70.

Each nose 82 may include a contact surface oriented substantially parallel to an adjacent surface of the plate 68, such as the first and second surfaces 72, 74 of the plate, respectively. When the backplane contact 76 is unstressed, the distance between the noses 82 is greater than the thickness of the plate 68. Accordingly, one or both noses 82 of the backplane contact 76 extend beyond a respective surface of the plate 68.

Although a c-shaped backplane contact 76 is shown in FIG. 7, other shapes and types of backplane contacts may be used herein. For example, another backplane contact having resilient members that protrude slightly from the first and second surfaces 72, 74 of the plate 68 would also be suitable. Examples of other suitable backplane contacts are illustrated and described in U.S. Pat. Nos. 6,787,709 and 7,556,503, the entire contents of both of which are incorporated herein by reference.

The third component or backplane connector 66 is electrically connectable to the second component 52. In an embodiment, one or more of the plurality of second attachment regions 62 are electrically connectable with the third component 66. The noses 82 at or protruding beyond the first surface 72 of the plate 68 may be configured to contact and electrically connect to the second attachment regions 62 of the second component 52 to electrically connect the second component 52 and the third component 66. Accordingly, via the interposer member 52, the plurality of backplane contacts 76 of the backplane connector 66 is electrically connectable to the plurality of electrical contacts of the electrical terminal assembly 24 of the electrical connector 22. Similarly, when the connector assembly 20 is mounted to a second substrate 14, the noses 82 at or protruding beyond the second surface 74 of the third component 66 are configured to contact and electrically connect to a corresponding attachment region 110 located at the adjacent surface 109 of the second substrate 14 to electrically couple the plurality of contacts of the electrical terminal assembly 24 to the second substrate 14.

One or more fasteners 90 may be used to maintain the first component 22, second component 52, and third component 66 of the connector assembly 20 in an assembled configuration in which the components are stacked or positioned adjacent to and in direct contact with one another along the axis X. In an embodiment, the at least one fastener 90 is extendable through each of the electrical connector 22, the interposer member 52, and the backplane connector 66. The at least one fastener 90 may be a bolt and may include shaft 92 having threads formed over at least a portion thereof. As shown, the fasteners 90 may include a head 94 arranged at a first end 96 thereof, the head 94 having a diameter greater than the diameter of the shaft 92. However, embodiments where the at least one fastener 90 does not include such a head 94 are also contemplated herein.

Each of the housing 28, the interposer member 52, and the backplane connector 66 may have one or more corresponding openings 98, 100, 102 formed therein for receiving the fasteners 90. Although the openings 98 formed in the housing 28 are illustrated as through holes in FIG. 3, it should be understood that in other embodiments, the openings 98 may not extend through the front end 29 of the housing 28 (FIG. 4). In the illustrated, non-limiting embodiment of FIG. 4, the openings 100, 102 formed in the second component 52 and the third component 66, respectively, for receiving the fasteners 90 are notches that extend inwardly from a first end 122, 116 and a second end 124, 118 of the second component 52 and the third component 66, respectively. However, embodiments where one or more of the openings 100, 102 is enclosed and formed at a location offset from an edge of the second component 52 and the third component 66 are also contemplated herein.

Figure 2:
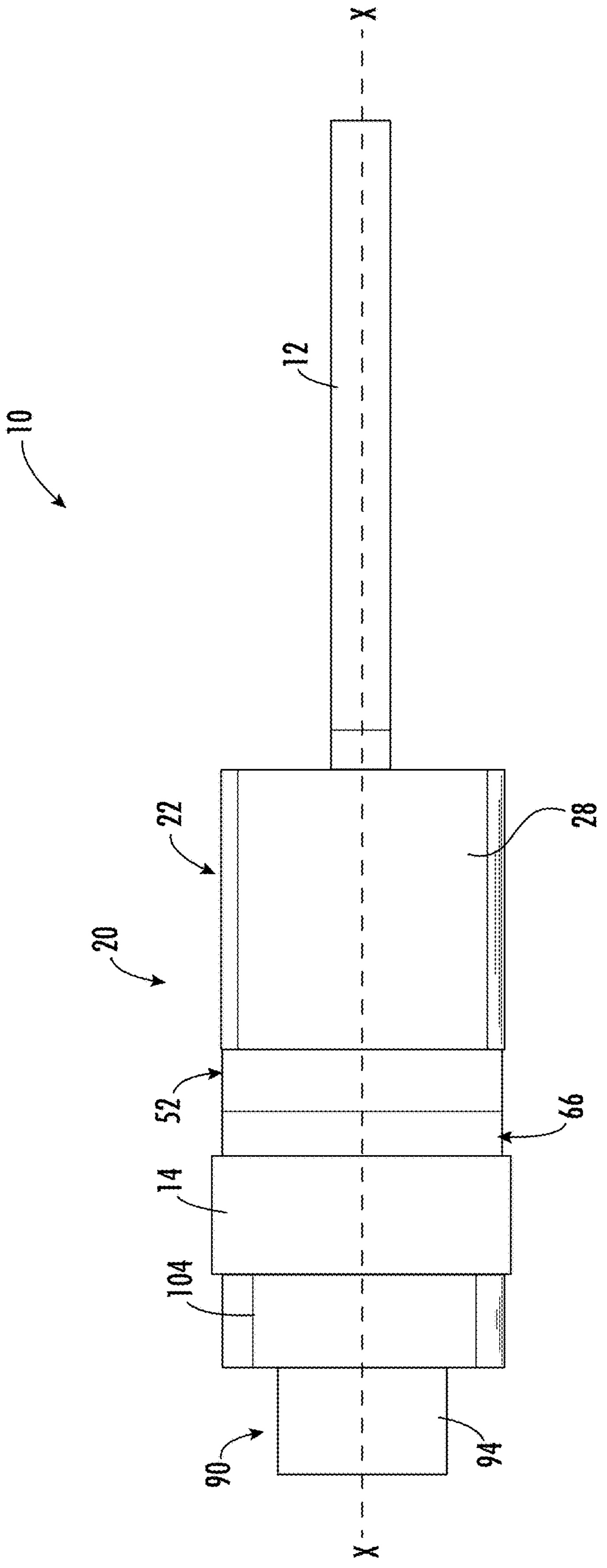
FIG. 2 is a side view of an interconnection system including a connector assembly according to an embodiment.
Figure 8:
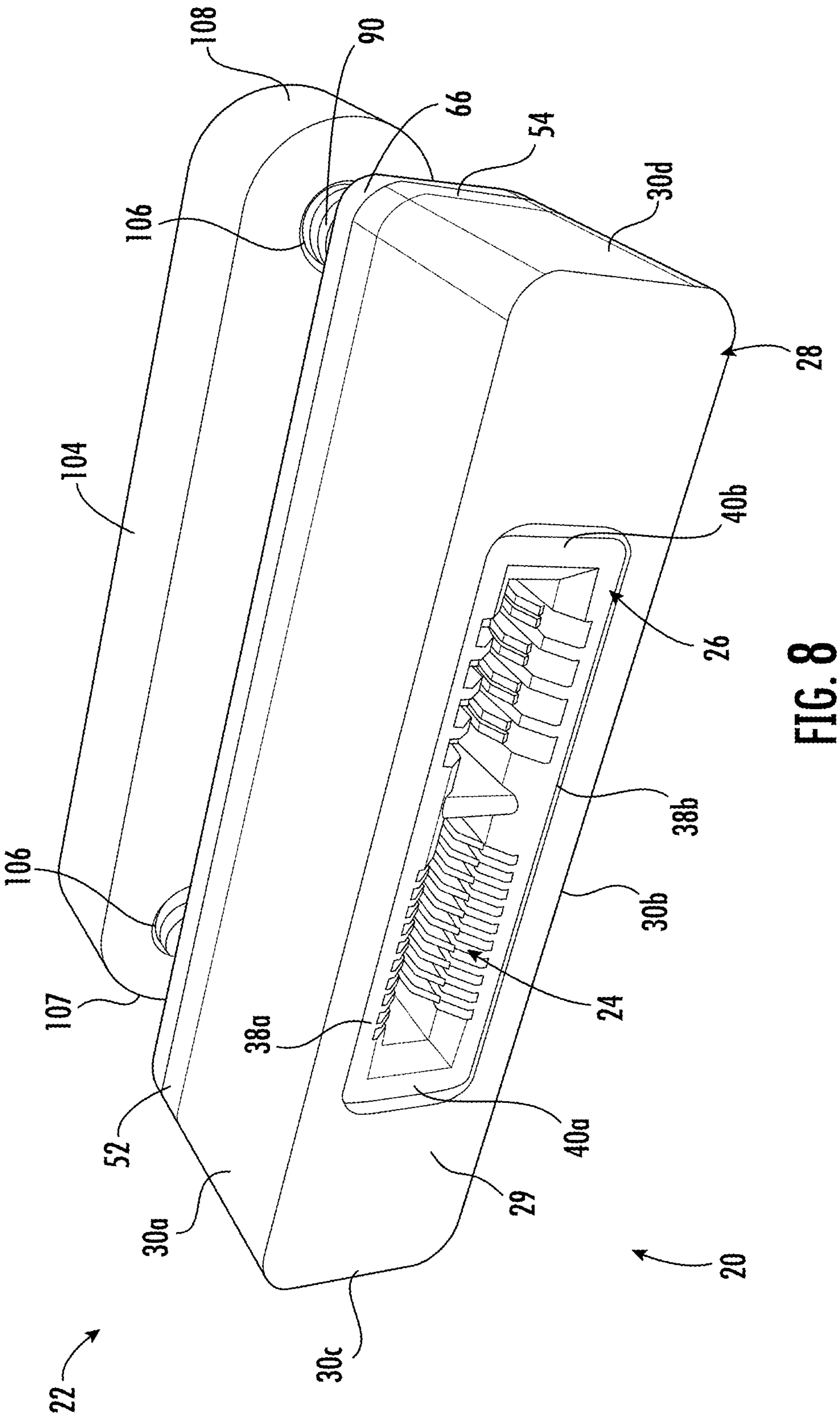
FIG. 8 is a perspective view of a connector assembly according to an embodiment.
Figure 9:
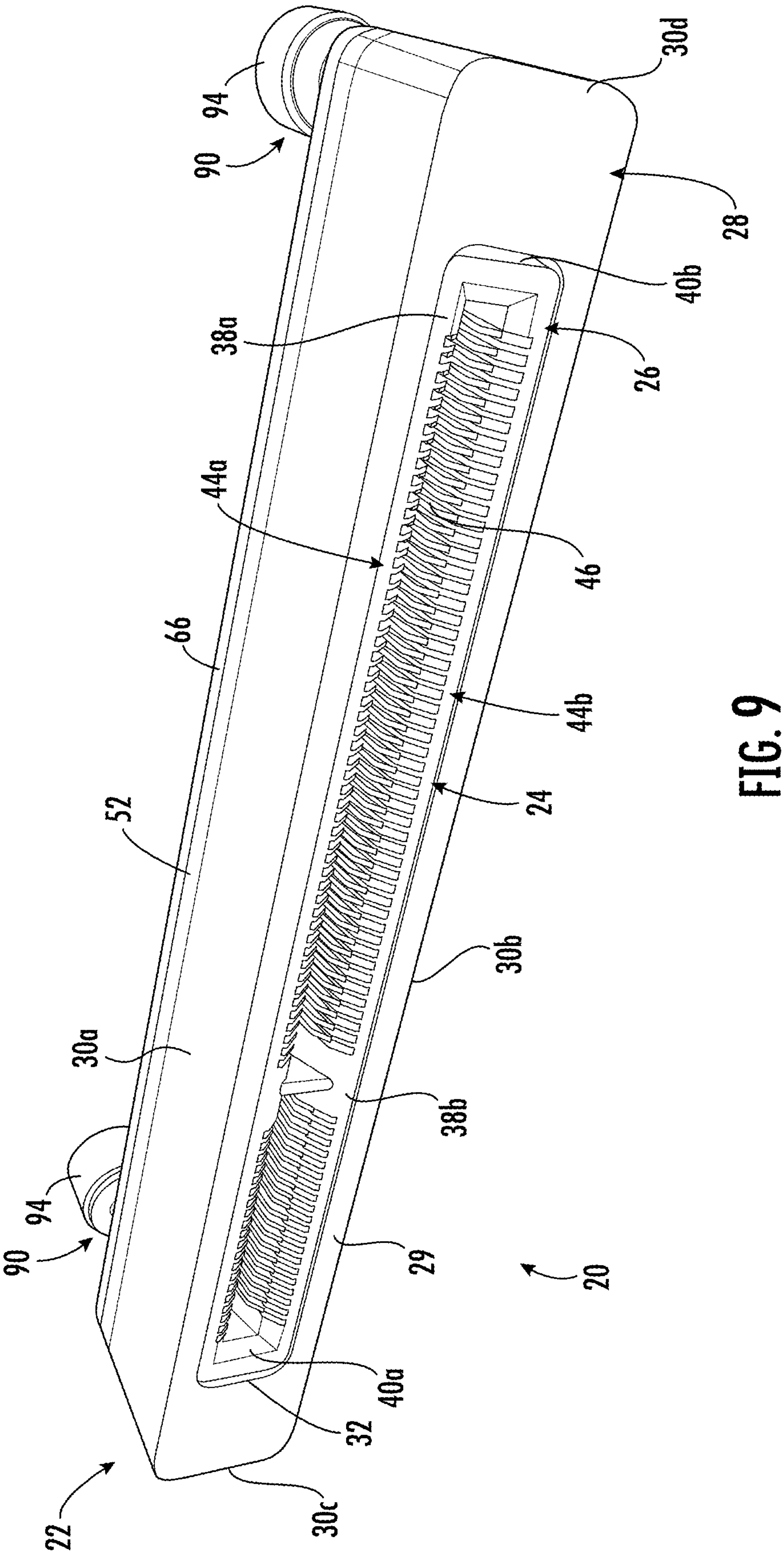
FIG. 9 is a perspective view of a connector assembly without a support member according to another embodiment.

In an embodiment, the connector assembly 20 additionally includes a support member 104 (see FIGS. 2, 3, and 8), also referred to herein as a bolster plate. Inclusion of the support member 104 may add structural rigidity to the interconnection system 10. The support member 104 may be formed from any suitable material, such as steel for example, and may have any suitable configuration, such as based on the stresses of the second substrate 14 and the stiffness thereof for example. As shown in FIG. 2, for example, the support member 104 is positionable adjacent to the second substrate 14, opposite the stacked first component 22, second component 52, and third component 66. In some embodiments, (see, for example, FIG. 3) the support member 104 additionally includes one or more openings 106 through which the fasteners 90 are configured to extend. Accordingly, the openings 106 of the support member 104 are configured to overlap with the aligned openings 98, 100, 102 of the stacked first component 22, second component 52, and third component 66. In an embodiment, shown in FIG. 8, the configuration of the support member 104 is substantially uniform between a first and second opposite end 107, 108 thereof. However, in other embodiments, as shown in FIG. 3, the configuration of the support member 104 may vary between the first and second ends 107, 108 thereof, such as to apply increased rigidity at select areas. Additionally, it should be understood that in some embodiments, the connector assembly 20 need not include a support member 104 as described herein.

When a second substrate 14 and a first substrate 12 are coupled by an electrical connector, such as connector assembly 20, a slight misalignment may occur, such as due to tolerance stackups for example. In an embodiment, the connector assembly 20 is capable of accommodating this misalignment between the first substrate 12 and the second substrate 14 by allowing relative movement between adjacent components of the connector assembly 20. For example, in the exemplary embodiment shown in FIGS. 10B and 12B, the third component 66 is movable relative to the second component 52. In such embodiments, the third component 66 is movable in one or more directions within a plane oriented parallel to the second surface 60 of the second component 52. The plane may also be oriented or arranged at an angle, such as a 90° angle for example, to the longitudinal axis X of the connector assembly 20.

Figure 10A:
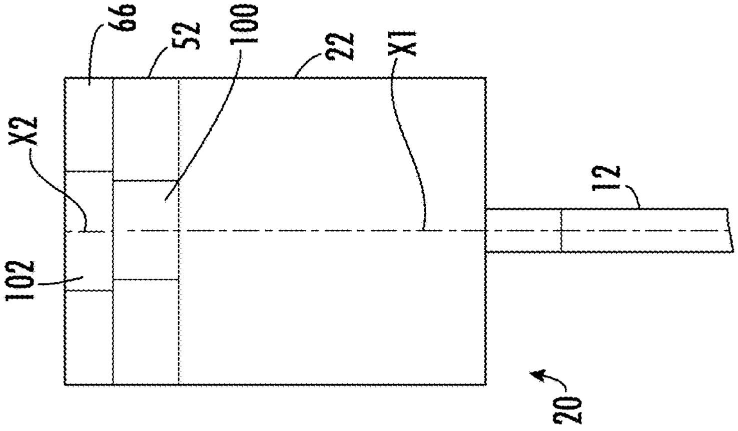
FIG. 10A is an end view of a connector assembly when the third component is in a first aligned configuration relative to the second component according to an embodiment.

With reference now to FIG. 10A, an end view of the connector assembly 20 is illustrated where the third component 66 is arranged in a first configuration relative to the second component 52. In the first configuration, the central axis X2 of the at least one opening 102 formed in the third component 66 is coaxial with the central axis X1 of the at least one corresponding opening 98 of the housing 28 and the at least one opening 100 in the second component 52. In such embodiments the axes X1 and X2 may, but need not be coaxial with a central axis of the second substrate 14 (not shown).

Figure 11A:
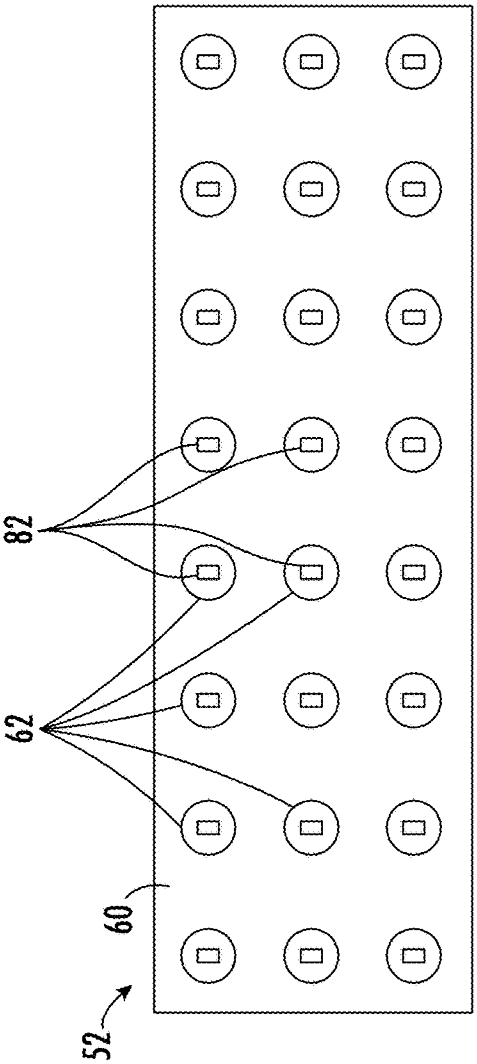
FIG. 11A is a plan view of the second surface of the second component of the connector assembly when the third component is in a first aligned configuration relative to the second component according to an embodiment.

FIG. 11A represents the position of the nose 82 of the plurality of backplane contacts 76 of the third component 66 relative to the contact pads of the plurality of second attachment regions 62 when the third component 66 is in this first, aligned configuration. As shown, a size of the second attachment regions 62 or the contact pads thereof may be larger than the nose 82 of the backplane contacts 76 configured to engage the second attachment regions 62. In an embodiment, when the third component 66 is in this first configuration, the nose 82 of each of the backplane contacts 76 is disposed at a first location relative to the second attachment regions 62, such as generally near a center of each of the second attachment regions 62 for example. However, embodiments where the noses 82 of the backplane contacts 76 are arranged at another location about the second attachment regions 62 when the third component 66 is in axial alignment with the second component 52 are also contemplated herein. It should be appreciated that the position of each nose 82 relative to a corresponding second attachment region 62 may vary slightly due to the inherent tolerances associated with manufacturing both the second component and the third component 66. Furthermore, in embodiments where the third component 66 is in the first configuration, one or more individual noses 82 may be arranged at a first position relative to the second attachment regions 62, and at least one nose 82 may be arranged at a distinct, second position relative to a corresponding second attachment region 62.

Figure 11B:
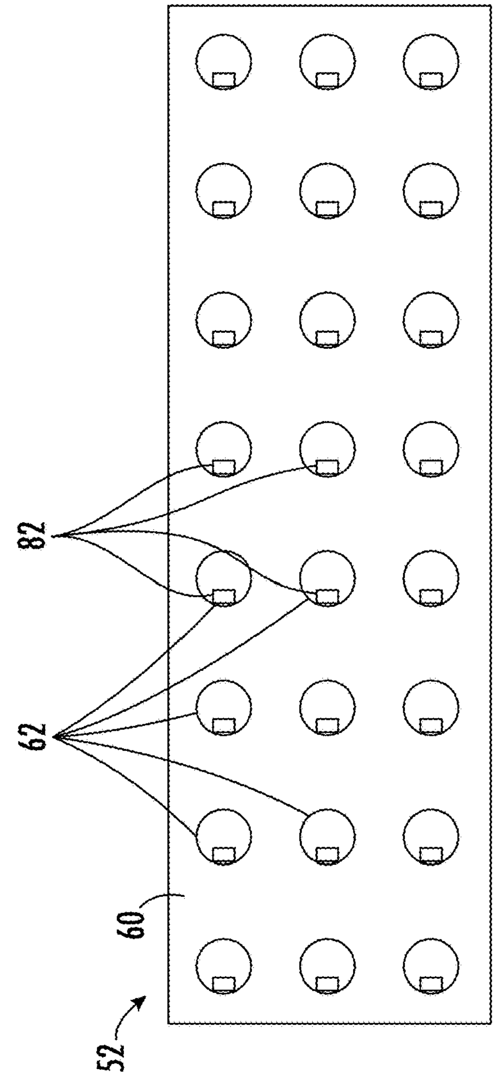
FIG. 11B is a plan view of the second surface of the second component of the connector assembly when the third component is in a second offset configuration relative to the second component according to an embodiment.
Figure 10B:
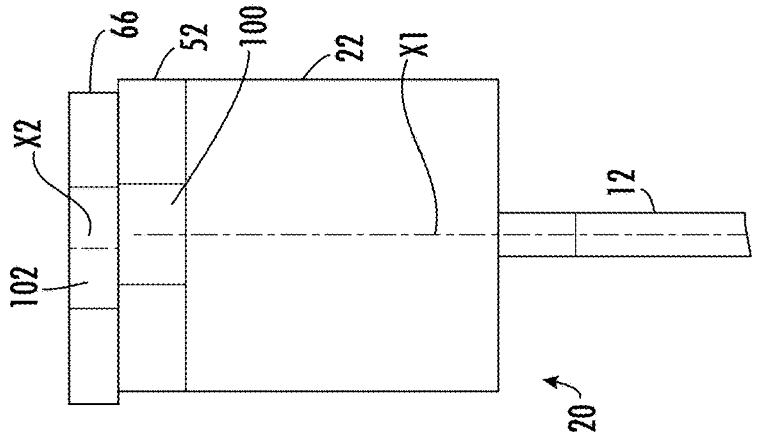
FIG. 10B is an end view of a connector assembly when the third component is in a second offset configuration relative to the second component according to an embodiment.

FIGS. 10B and 11B represent the connector assembly 20 when the third component 66 is in a second configuration relative to the second component 52, such as offset from or misaligned with the second component 52. In this second configuration, the central axis X2 of the at least one opening 102 formed in the third component 66 is shifted or offset in one or more directions from the central axis X1 of the openings 98 and 100 formed in the housing 28 and the second component 52. In the second configuration, the central axis X2 of the at least one opening 102 may be offset from or may be aligned with from the central axis of the second substrate 14 (not shown). In the illustrated, non-limiting embodiment, in the second misaligned configuration, each of the noses 82 of the backplane contacts 76 are disposed adjacent to a side or edge of the second attachment regions 62. Accordingly, as shown, the third component 66 has been shifted left relative to the second component 52. However, it should be appreciated that in the second offset or misaligned configuration, the third component 66 may be shifted in any suitable direction (such as left, right, or any combination thereof) relative to the second component 52. Furthermore, embodiments where one or more of the backplane contacts 76 is arranged at another location about the second attachment regions 62, such as at a center of the second attachment regions 62 for example, when the third component 66 is offset from the second component 52 and the longitudinal axis X are also contemplated herein.

It should be understood that the position of the nose 82 of each backplane contact 76 relative to a second attachment region 62 when the third component 66 is in the second configuration will depend not only on the original position of the nose 82 relative to a second attachment region 62, but also the direction of misalignment of the third component 66 relative to the second component 52. Accordingly, it should be appreciated that the enlarged size of the second attachment regions 62 or the contacts pads thereof is selected to maintain electrical contact between the second component 52 and third component 66 regardless of the relative position of the second component 52 and the third component 66 so long as the misalignment is within boundaries permitted between the second component 52 and the third component 66.

Alternatively, or in addition to the movement of the at least one movable component of the connector assembly 20 relative to the second component 52 as described above, the at least one movable component of the connector assembly 20 may be movable relative to one of the first and second substrates 12, 14 connectable to the connector assembly 20. In an embodiment, third component 66 is movable relative to the second substrate 14 to accommodate misalignment therebetween. In such embodiments, the third component 66 is movable in one or more directions within a plane oriented parallel to the surface 109 of the second substrate 14 facing the third component 66. The plane of movement of the third component 66 relative to the second substrate 14 may be parallel to the plane of movement of the third component 66 relative to the second component 52.

Figure 12A:
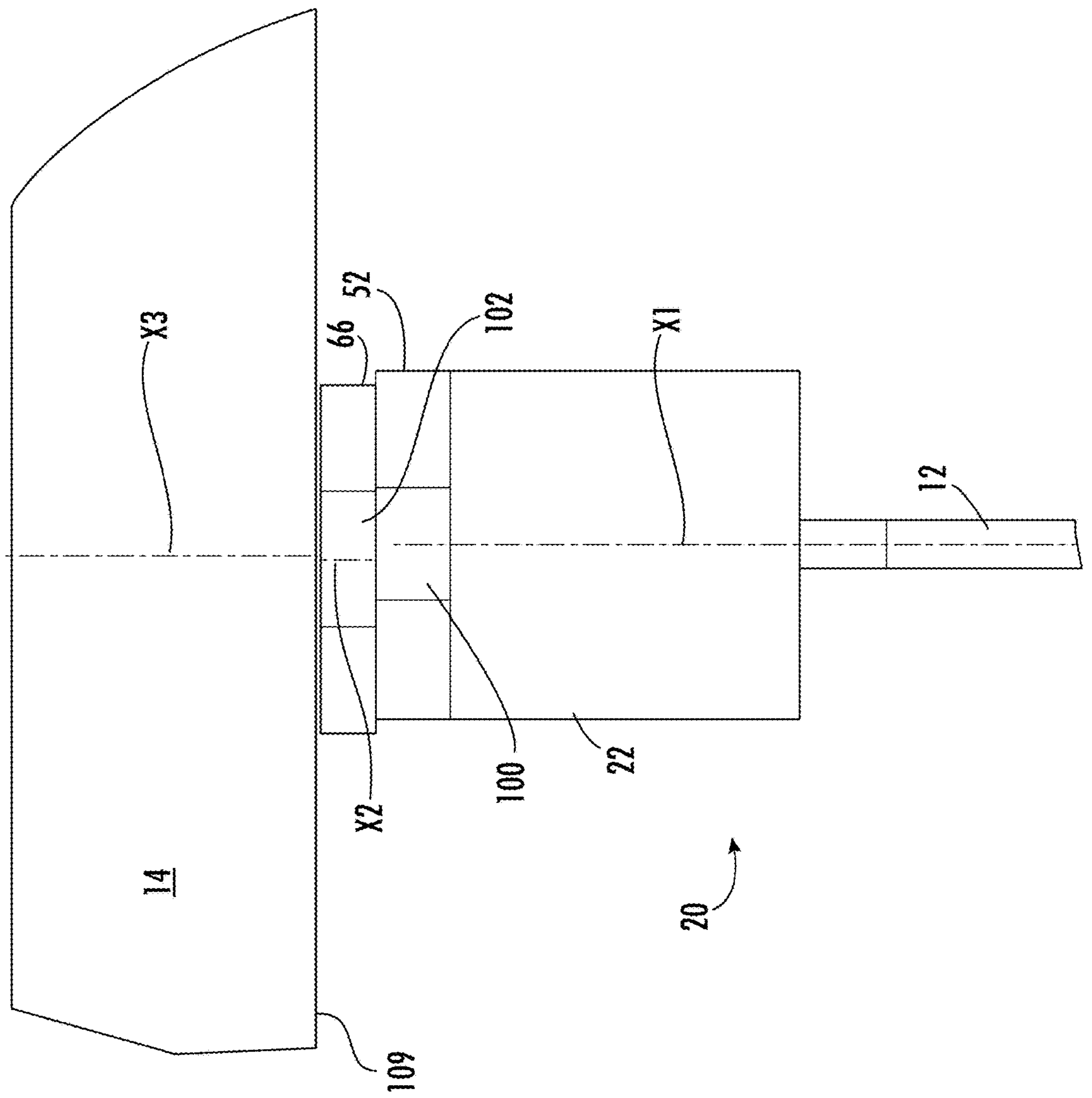
FIG. 12A is an end view of a connector assembly when the third component is in a first aligned configuration relative to the second substrate according to an embodiment.
Figure 13A:
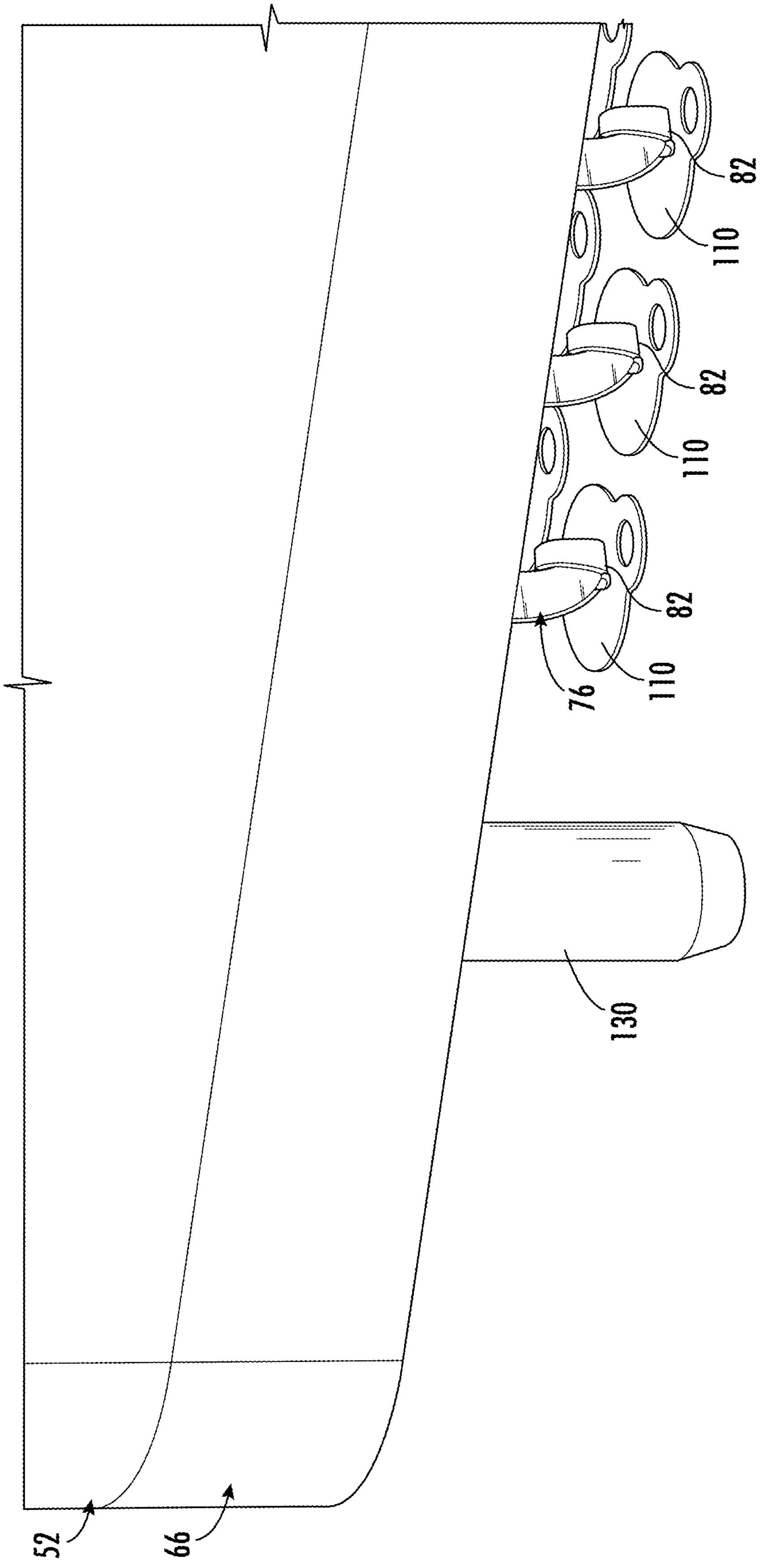
FIG. 13A is a perspective view of the interface between the backplane contacts of the third component and the attachment regions of the second substrate when the third component is in a first aligned configuration relative to the second substrate according to an embodiment.

With reference to FIGS. 12A and 13A, the third component 66 is illustrated in a first configuration relative to the second substrate 14. In this first configuration, the central axis X2 of the at least one opening 102 formed in the third component 66 is aligned with a central axis X3 of at least one corresponding opening (not shown) formed in the second substrate 14 and configured to receive a fastener 90. In such embodiments the axis X2 may, but need not be coaxial with the central axis X1 of the openings 98, 100 of the housing 28 and the second component 52. As shown in FIG. 13A, when the central axis X2 is aligned with the central axis X3, the noses 82 of the backplane contacts 76 may be configured to abut or engage a central portion or each of the attachment regions 110 or contact pads thereof.

Figure 12B:
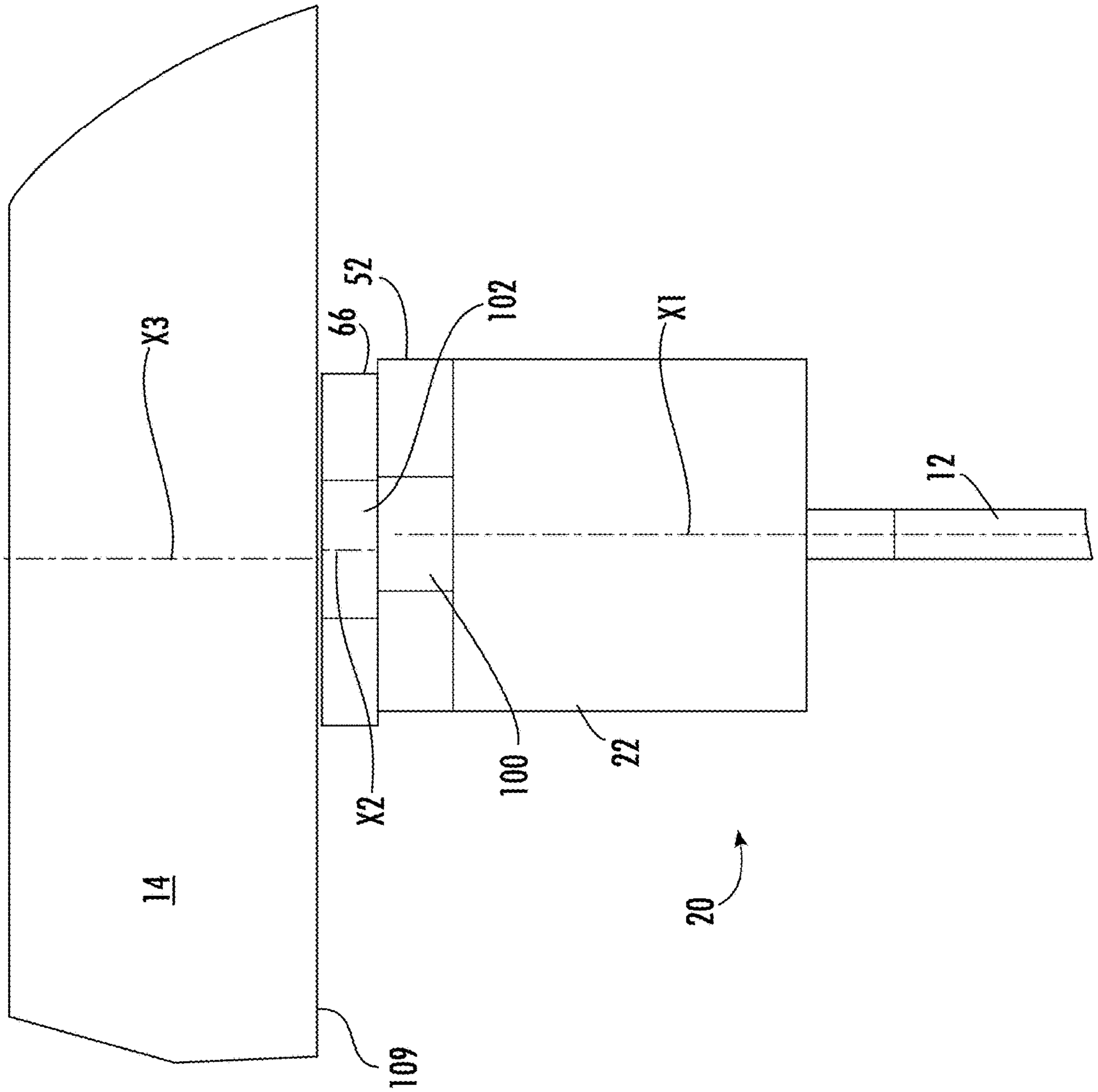
FIG. 12B is an end view of a connector assembly when the third component is in a second offset configuration relative to the second substrate according to an embodiment.
Figure 13B:
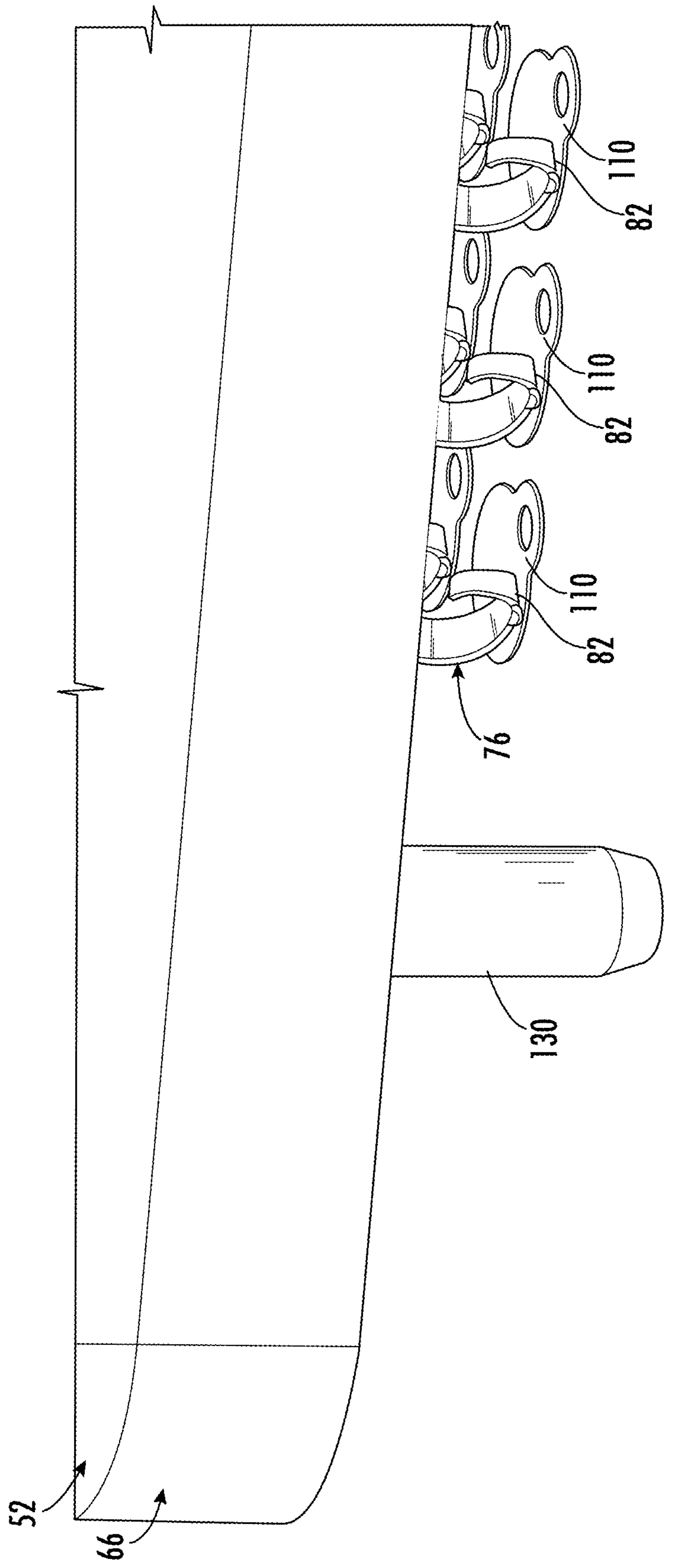
FIG. 13B is a perspective view of the interface between the backplane contacts of the third component and the attachment regions of the second substrate when the third component is in a second offset configuration relative to the second substrate according to an embodiment.

FIGS. 12B and 13B similarly represent the connector assembly 20 when the third component 66 is in a second configuration relative to the second substrate 14. In this second configuration, the central axis X2 of the at least one opening 102 formed in the third component 66 is shifted or offset in one or more directions from the central axis X3 of the at least one opening (not shown) formed in the second substrate 14. In such embodiments the axis X2 may, but need not be coaxial with a central axis X1 of the openings 98, 100 of the housing 28 and the second component 52. In this second, axially offset configuration relative to the second substrate 14, the noses 82 of the backplane contacts 76 may be arranged at another location about the attachment regions 110, such as near a periphery or edge thereof for example. It should be appreciated that the size of the attachment regions 110 or the contacts pads thereof of the second substrate 14 have been enlarged to maintain electrical contact between the third component 66 and the second substrate 14 regardless of the relative position of the third component 66 and the second substrate 14 so long as the misalignment is within boundaries permitted between the third component 66 and the second substrate 14.

As described above, the movement of the third component 66 relative to one or both of the second component 52 and the second substrate 14 may be permitted within certain boundaries. The boundaries of movement of the third component 66 relative to one or both of the second component 52 and the second substrate 14 may be achieved via any suitable configuration. For example, in the illustrated, non-limiting embodiment, best shown in FIGS. 4 and 14, the third component 66 includes at least one opening 112 configured to receive a guide pin 114 therein, and the interaction of the at least one opening 112 and the guide pin 114 provides a boundary of movement. A first opening 112 may be formed adjacent to a first end 116 of the plate 68 and a second opening 112 may be formed adjacent to an opposite, second end 118 of the plate 68 (see FIG. 4). The first and second openings 112 may be substantially identical in size and/or shape. Although the openings 112 are illustrated as being circular in shape, embodiments where the openings 112 have any shape suitable to receive a guide pin 114 therein are within the scope of the disclosure. Further, the first and second opening 112 may be centered about a central longitudinal axis B of the third component 66. However, in other embodiments, the first and second openings 112 may be offset from the central longitudinal axis B in the same direction (see FIG. 4), or alternatively, in opposite directions.

Figure 14:
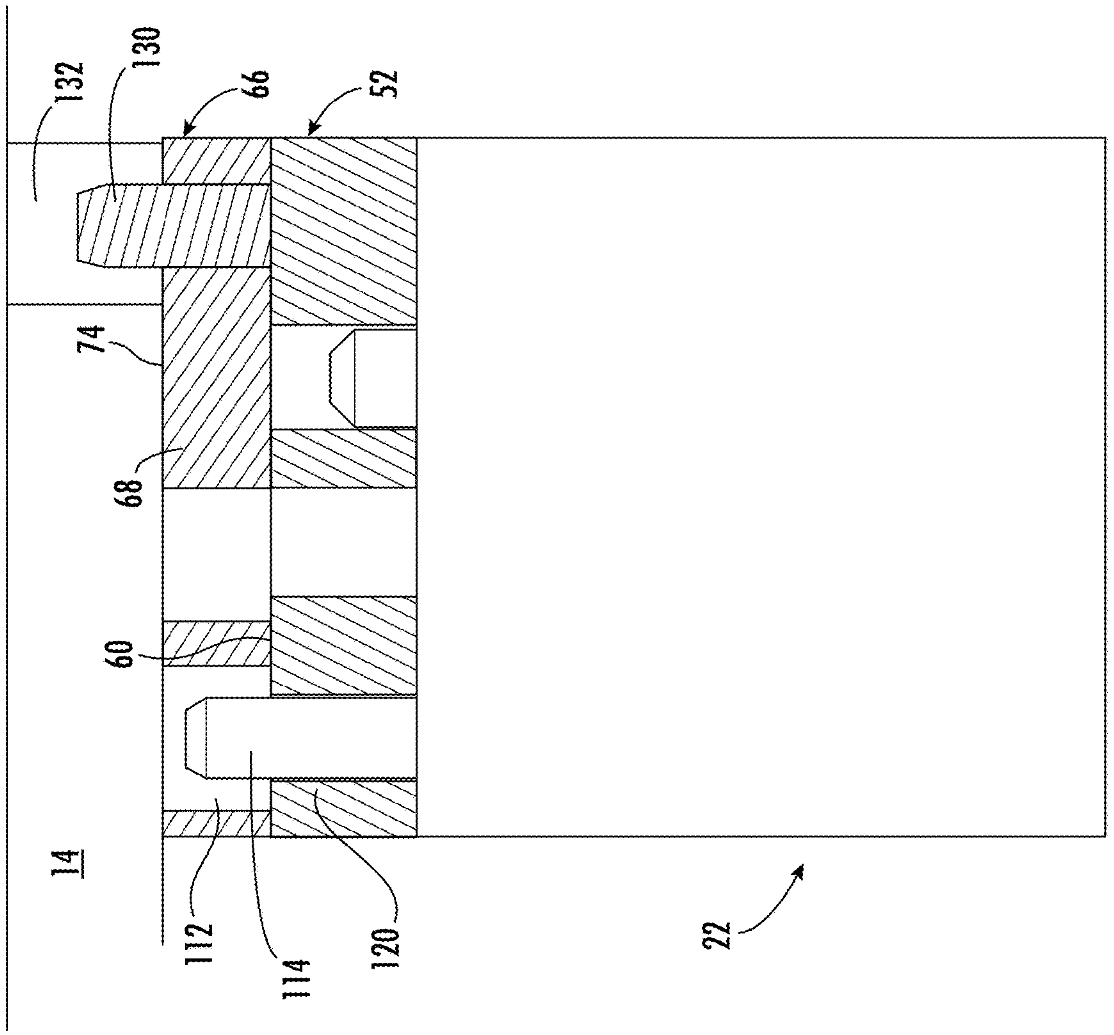
FIG. 14 is a cross-sectional view of the connector assembly in contact with a second substrate according to an embodiment.

In an embodiment, to allow for movement of the third component 66 relative to the adjacent second component 52, an inner diameter of the at least one opening 112 is greater than the diameter of the guide pin 114 receivable within the opening 112 (see FIG. 14). Accordingly, the third component 66 is able to move or float about an "area of movement" that has a size equal to the clearance between the inner diameter and the guide pin 114 in at least one direction, and in some embodiments in a plurality of directions. In embodiments where the opening 112 is circular, the third component 66 is movable by a distance equal to the clearance between the inner diameter and the guide pin 114 about the periphery of the guide pin 114. In an embodiment, the third component 66 is movable relative to the second component 52 up to 0.01 inches in each direction within the plane. It should be understood that the overall size and shape of the second attachment regions 62 or the contact pads thereof will be selected based on the area of movement defined by the interface between the guide pin 114 and the opening 112. In an embodiment, the size of the second attachment regions is equal to or larger than the area of movement of the third component 66.

The at least one guide pin 114 receivable within the at least one opening 112 formed in the plate 68 of the third component 66 protrudes beyond the second surface 60 of the second component 52. In an embodiment, the at least one guide pin 114 is integrally formed with and extends from a portion of the second component 52, such as the second surface 60 thereof. However, in other embodiments the second component 52 includes at least one through opening 120 through which the guide pin 114 also extends. For example, in the illustrated, non-limiting embodiment of FIG. 4, the second component 52 includes a first through opening 120 located adjacent to a first end 122 thereof and a second through opening 120 formed adjacent to an opposite, second end 124 thereof. The first and second through openings 120 may be centered along a central longitudinal axis I of the second component 52. However, in other embodiments, the first and second through openings 120 may be offset from the central longitudinal axis I in the same direction (see, for example, FIG. 4), or alternatively, in opposite directions. In an embodiment, the first and second through openings 120 are formed at a position about the second component 52 such that the openings 120 axially overlap with a respective one of the first and second openings 112 formed in the third component 66. In an embodiment, the size and shape of the through openings 120 is substantially equal to the diameter and shape of the guide pin 114, such that movement of the second component 52 relative to the first component 22 when the guide pin 114 is positioned within the through openings 120 is minimal.

In embodiments where the second component 52 includes through openings 120 within which the guide pins 114 are receivable, the at least one guide pin 114 may protrude from the housing 28 of the first component 22, beyond the end 54 thereof. Accordingly, the guide pin 114 must have an axial length, measured parallel to the axis X, sufficient to pass through the through opening 120 formed in the second component 52 and extend at least partially into a corresponding opening 112 formed in the third component 66. As shown in FIG. 14, the guide pin 114 may not extend beyond the second surface 74 of the third component 66, so as not to interfere with the second substrate 14.

With continued reference to FIG. 14, in an embodiment, at least one second guide pin 130 protrudes from the third component 66, such as beyond a second surface 74 of the third component 66. The second substrate 14 includes at least one guide opening 132 configured to receive the second guide pin 130 therein. As shown, an inner diameter of the at least one guide opening 132 is greater than the diameter of the second guide pin 130 receivable therein. Because of this resulting clearance, the third component 66 is able to move or float a distance equal to the clearance between the inner diameter of the guide opening 132 and the second guide pin 130 in at least one direction, and in some embodiments in a plurality of directions. In an embodiment, the third component 66 is movable relative to the second substrate 14 up to 0.01 inches in each direction within the plane. It should be understood that the overall size and shape of the attachment regions 110 of the second substrate 14 will be selected based on the allowable movement defined by the interface between the second guide pin 130 and the guide opening.

In some embodiments, the guide opening 132 is positioned near the openings 112 and 120 and the guide pin 114 extends through both opening 112 and guide opening 132. In such embodiments, the interaction of the guide pin 114 and the opening 112 and guide opening 132 determines the movement or float of the third component 66 and the second substrate 14. In some embodiments, the second guide pin 130 is unnecessary if the guide pin 114 extends through both opening 112 and guide opening 132.

A connector assembly 20 having a third component 66 movable relative to the second component 52 of the connector assembly 20 and/or movable relative to the second substrate 14 ensures the formation of an electrical connection between a first substrate 12 and a second substrate 14 even when the interfaces with one or both of the first substrate 12 and a second substrate 14 are misaligned. Accordingly, the connector assembly 20 can adapt to tolerance variations without using bending or flexbeams, which generate stress. The third component 66 may be movable during assembly of the connector assembly 20 on the second substrate 14 and, once the connector assembly 20 is in the desired location with respect to the second substrate 14, the third component 66 may be secured in place with respect to the second component 52 and the second substrate 14, for example, by securing the fasteners 90.

Figure 15:
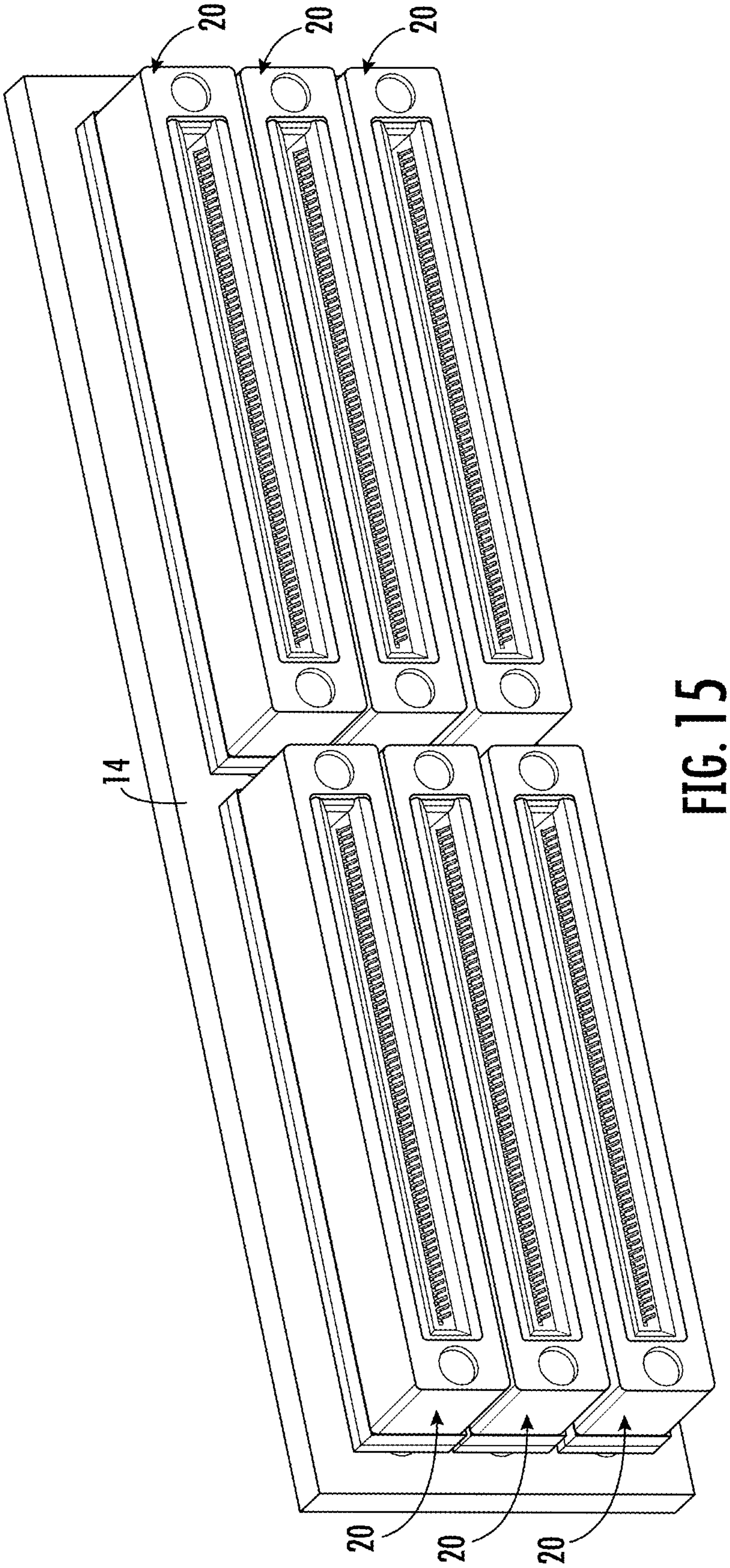
FIG. 15 is a front perspective view of a second substrate having a plurality of connector assemblies attached thereto.
Figure 16:
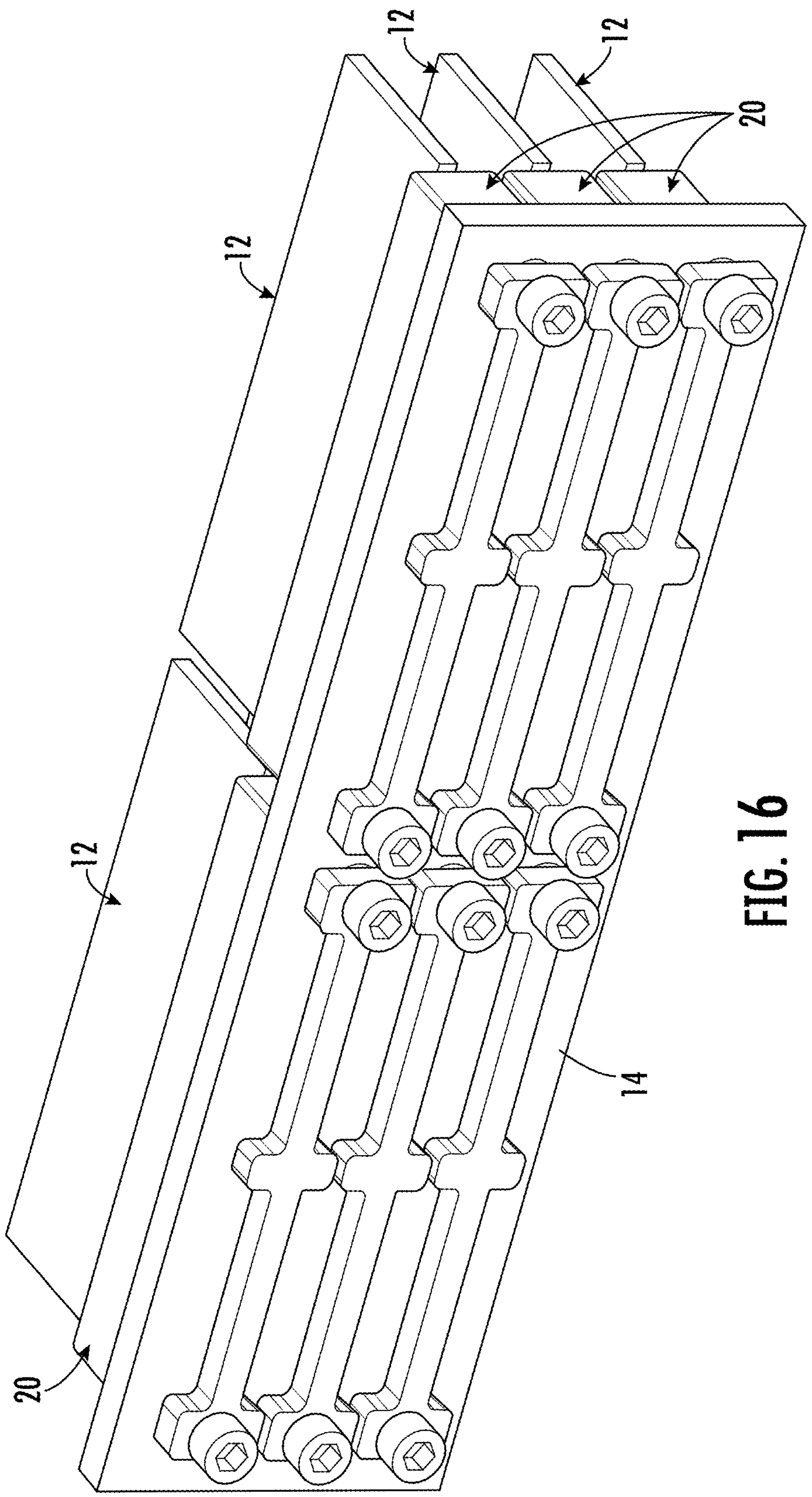
FIG. 16 is a rear perspective view of the second substrate of FIG. 15 with the first substrates assembled to the connector assemblies according to an embodiment.

With reference to FIGS. 15 and 16, at least one connector assembly 20, and in some embodiments, a plurality of connector assemblies 20 may be assembled or affixed to a single second substrate 14. This assembly of a plurality of connector assemblies 20 to the second substrate 14 may occur sequentially, or alternatively, simultaneously. In embodiments where the connector assemblies 20 are installed sequentially, each connector assembly 20 may be positioned such that backplane contacts 76 of the third component 66 are arranged in contact with a respective pad or attachment region 110 of the second substrate 14. It should be appreciated that when the third component 66 is connected to the second substrate 14, the central axis X2 of the opening 102 of the third component 66 may be aligned with, or may be offset from the central axis X3 of the openings (not shown) of the second substrate 14 as previously described. Once positioned, the support member 104 will be attached to the connector assembly 20 via one or more fasteners 90 to lock each connector assembly 20 in a desired position. The first substrate 12 may be connected to the connector assembly 20 prior to or after the connector assembly 20 is attached to the second substrate 14.

In other embodiments, the plurality of connector assemblies 20 may be loosely connected or affixed to the second substrate 14 prior to installation of the first substrates 12. In this "loosely connected" configuration, the plurality of connector assemblies 20 are movable relative to the second substrate 14, but are not separable therefrom as a result of the fasteners 90. In such embodiments, the plurality of first substrates 12 may be blind mated to the plurality of connector assemblies 20. During a blind-mating process, the first substrates 12 are inserted into the clearance 46 of the terminal assembly 24 for connection with the contacts thereof. Further, during a blind-mating process the individual components of the connector assemblies 20 are not accessible. However, because of available float of the third component 66 relative to one or both of the second component 52 and the second substrate 14, as the fasteners 90 are tightened to lock the connector assembly 20 in position, the third component 66 will automatically move to the extent possible, to a position where the noses 82 thereof are arranged in contact with both the second attachment regions 62 and the attachment regions 110. Accordingly, in a blind-mating process, the tightening of the fasteners 90 will cause the third component 66 to shift as required relative to both the second substrate 14 and the second component 52 to address the misalignment between the first substrate 12 and the second substrate 14.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A connector assembly comprising:

an electrical connector including a plurality of electrical contacts;

a backplane connector electrically connectable to said electrical connector and positioned along an axis with said electrical connector, said backplane connector being movable within a plane arranged at an angle relative to said axis, and an interposer member mechanically connected to and electrically connectable to said plurality of electrical contacts and positioned along said axis, said interposer member being positioned between said electrical connector and said backplane connector.

2. The connector assembly of claim 1, wherein said backplane connector is electrically connectable to said interposer member.

3. The connector assembly of claim 1, wherein said backplane connector is movable relative to said interposer member within said plane arranged at said angle relative to said axis between a first aligned configuration and a second misaligned configuration.

4. The connector assembly of claim 3, wherein said backplane connector is electrically connectable to said plurality of electrical contacts in both said first aligned configuration and said second misaligned configuration.

5. The connector assembly of claim 3, wherein said interposer member further comprises:

a plurality of first attachment regions electrically and mechanically connectable to said plurality of electrical contacts; and a plurality of second attachment regions electrically connectable to said backplane connector.

6. The connector assembly of claim 1, further comprising at least one guide pin extending beyond a surface of said interposer member, said backplane connector further comprising at least one opening within which said at least one guide pin is receivable.

7. The connector assembly of claim 6, wherein a clearance is formed between an inner diameter of said at least one opening and said at least one guide pin.

8. The connector assembly of claim 6, wherein said at least one guide pin extends from said electrical connector and said interposer member further comprises at least one through opening, said at least one guide pin being receivable within said at least one through opening.

9. The connector assembly of claim 1, wherein said electrical connector is connectable to a first substrate and said backplane connector is connectable to a second substrate.

10. The connector assembly of claim 9, wherein said first substrate is arranged perpendicular to said second substrate.

11. A connector assembly comprising:

a first component including a plurality of electrical contacts and at least one guide pin; and a third component including a plurality of backplane contacts electrically connectable to said plurality of electrical contacts and at least one opening for receiving said at least one guide pin, said at least one opening being larger than said at least one guide pin such that said third component is movable relative to said first component.

12. The connector assembly of claim 11, wherein a clearance is formed between an inner diameter of said at least one opening and said at least one guide pin.

13. The connector assembly of claim 11, wherein said third component is movable relative to said first component between a first aligned configuration and a second misaligned configuration.

14. The connector assembly of claim 11, further comprising a second component stackable relative to said first component along an axis, said second component being positionable between said first component and said third component.

15. The connector assembly of claim 14, wherein said second component further comprises:

a plurality of first attachment regions electrically and mechanically connectable to said first component; and a plurality of second attachment regions electrically connectable to said third component.

16. The connector assembly of claim 14, wherein said second component further comprises at least one through opening, said at least one guide pin being receivable within said at least one through opening.

17. The connector assembly of claim 11, wherein said first component is connectable to a first substrate and said third component is connectable to a second substrate.

18. An interconnection system comprising:

at least one connector assembly further comprising:

an electrical terminal assembly for receiving a first substrate; and a backplane connector electrically connected to said electrical terminal assembly along an axis, said backplane connector being movable within a plane arranged at an angle relative to said axis; and a second substrate, said at least one connector assembly being affixed and electrically connected to said second substrate.

19. The interconnection system of claim 18, wherein said at least one connector assembly further comprises a plurality of connector assemblies.

20. The interconnection system of claim 18, wherein said backplane connector of said at least one connector assembly is electrically coupled to said second substrate.

21. The interconnection system of claim 18, wherein said at least one connector assembly is loosely connected to said second substrate.

22. The interconnection system of claim 18, wherein said backplane connector is movable within said plane between a first aligned configuration and a second misaligned configuration, said backplane connector being electrically connected to said electrical terminal assembly in both said first aligned configuration and said second misaligned configuration.

23. A connector assembly comprising:

an interposer member having a plurality of first attachment regions and a plurality of second attachment regions; and a backplane connector electrically connectable to said plurality of second attachment regions, said backplane connector being positioned along an axis relative to said interposer member and being movable relative to said interposer member about an area of movement;

wherein said second attachment regions are larger than said area of movement.

24. The connector assembly of claim 23, wherein said backplane connector is movable relative to said interposer member between a first aligned configuration and a second misaligned configuration.

25. The connector assembly of claim 24, wherein said backplane connector further comprises a plurality of backplane contacts, said plurality of backplane contacts being positionable in contact with said plurality of second attachment regions in both said first aligned configuration and said second misaligned configuration.

26. The connector assembly of claim 23, further comprising at least one guide pin protruding beyond said interposer member, said backplane connector further comprising at least one opening within which said at least one guide pin is receivable.

27. The connector assembly of claim 26, wherein a clearance is formed between an inner diameter of said at least one opening and said at least one guide pin.

* * * * *